US012810845B2

(12) United States Patent
Rothschild

(10) Patent No.: US 12,810,845 B2
(45) Date of Patent: Nov. 24, 2026

(54) SYSTEM AND A METHOD TO ADAPTIVELY GENERATE CONVERSATIONAL CONTENT WITH A VIRTUAL VOICE ASSISTANT

(71) Applicant: Leigh M. Rothschild, Miami, FL (US)

(72) Inventor: Leigh M. Rothschild, Miami, FL (US)

( * ) Notice: Subject to any disclaimer, the term of this patent is extended or adjusted under 35 U.S.C. 154(b) by 0 days.

(21) Appl. No.: 19/390,076

(22) Filed: Nov. 14, 2025

(65) Prior Publication Data

US 2026/0188310 A1 Jul. 2, 2026

Related U.S. Application Data

(63) Continuation-in-part of application No. 19/008,536, filed on Jan. 2, 2025, now Pat. No. 12,608,568.

(51) Int. Cl.

| | |
|---|---|
| ***G10L 15/22*** | (2006.01) |
| ***G06Q 20/10*** | (2012.01) |
| ***G10L 15/16*** | (2006.01) |
| ***G10L 15/18*** | (2013.01) |
| ***G10L 15/183*** | (2013.01) |
| ***G10L 15/30*** | (2013.01) |
| ***G10L 25/63*** | (2013.01) |
| *G10L 15/08* | (2006.01) |

(52) U.S. Cl.

CPC .............. *G10L 15/16* (2013.01); *G06Q 20/10* (2013.01); *G10L 15/1815* (2013.01); *G10L 15/183* (2013.01); *G10L 15/22* (2013.01); *G10L 15/30* (2013.01); *G10L 25/63* (2013.01); *G10L 2015/088* (2013.01)

(58) Field of Classification Search

CPC .......... G10L 15/16; G10L 15/18; G10L 15/22

See application file for complete search history.

(56) References Cited

U.S. PATENT DOCUMENTS

| | | | |
|---|---|---|---|
| 10,621,978 | B2 | 4/2020 | Zamora Duran et al. |
| 11,526,720 | B2 | 12/2022 | Yonekura |
| 11,658,928 | B2 | 5/2023 | Choe |
| 12,608,568 | B1 | 4/2026 | Rothschild |

(Continued)

*Primary Examiner* — Jialong He

(74) *Attorney, Agent, or Firm* — Dobbin IP Law, P.C.; Geoffrey E. Dobbin

(57) ABSTRACT

An adaptive conversational content generation system utilizes advanced technologies to provide personalized, dynamic, and emotionally intelligent interactions through a virtual voice assistant. Central to the system is a cloud server that hosts an adaptive conversational content generation service, allowing the assistant to create real-time, context-aware content based on a user's personalized profile. Key components, such as the conversation simulator, feedback analysis unit, and emotional empathy cues unit, enable the system to engage users in empathetic, meaningful conversations. Additionally, the integration of predictive modeling and conflict resolution units ensures the assistant can proactively anticipate user needs and mediate emotional conflicts. The system supports multilingual interactions, enhancing accessibility across diverse linguistic and cultural backgrounds. The system adapts to network conditions, ensuring seamless functionality. The use of Generative Adversarial Networks further refines conversational authenticity, enabling the assistant to mimic nuanced human speech patterns for more natural, emotionally resonant interactions.

19 Claims, 4 Drawing Sheets

(56) References Cited

U.S. PATENT DOCUMENTS

| | | | | |
|---|---|---|---|---|
| 2002/0169700 | A1* | 11/2002 | Huffman | H04M 15/44 705/35 |
| 2018/0174055 | A1 | 6/2018 | Tirumale et al. | |
| 2018/0293483 | A1* | 10/2018 | Abramson | H04L 51/02 |
| 2023/0244900 | A1 | 8/2023 | Fidaleo et al. | |
| 2024/0161372 | A1* | 5/2024 | Jang | G10L 13/047 |
| 2025/0006182 | A1* | 1/2025 | Ingel | G10L 15/063 |

* cited by examiner

SYSTEM AND A METHOD TO ADAPTIVELY GENERATE CONVERSATIONAL CONTENT WITH A VIRTUAL VOICE ASSISTANT

TECHNICAL FIELD

The present disclosure in general relates to conversation systems. More particularly, the present disclosure relates to adaptive generation of conversational content through a sophisticated system that integrates real-time data processing, personalized user profiling, and advanced conversational technologies. The present disclosure leverages multi-modal interactions, machine learning, and artificial intelligence to facilitate engaging, personalized, and dynamic conversations between query users and a trained conversational simulator.

BACKGROUND

Traditional conversational systems often fail to provide personalized and contextually relevant interactions. Conversational systems may not adequately understand individual user preferences, emotional states, or contextual cues, resulting in generic and less engaging conversations. Many existing systems cannot dynamically adapt to real-time feedback or changes in user behavior during interactions. This limitation hinders the system's ability to maintain user engagement and satisfaction throughout the conversation. Conventionally, integrating and synchronizing different communication modalities (text, voice, and visual inputs) is technically challenging. Existing systems struggle to provide a seamless and coherent multi-modal interaction experience, limiting accessibility and user engagement. Conversational content requires significant computational resources and efficient algorithms to process large volumes of diverse data in real-time. Traditional systems often lack the scalability and efficiency needed to handle such data-intensive tasks effectively. Many systems do not adequately address privacy-preserving techniques, leading to potential risks of data breaches and misuse of sensitive information. Systems need to understand and respond to emotional cues, which requires advanced sentiment analysis and natural language understanding capabilities. Conversations that are emotionally engaging and empathetic are difficult to create. Systems often lack robust predictive models capable of identifying patterns and trends indicative of future user interests. User's needs and preferences to proactively generate relevant conversational content is complex to anticipate.

Rule-based systems use predefined rules and scripts to respond to user inputs. Personalization is limited to manually created branches in conversation flows. Some systems use simple profiling techniques based on limited user data, such as basic demographic information or historical interaction data. Rule-based systems cannot adapt to complex user preferences and contexts dynamically, leading to static and repetitive interactions. Basic profiling does not account for the depth of user preferences, emotional states, and real-time context, resulting in generic interactions that fail to engage users meaningfully. In static response generation responses are generated based on fixed patterns or templates without considering real-time feedback. Some systems periodically update their response strategies based on aggregate user data, but these updates are not real-time. Periodic updates do not allow the system to respond to immediate changes in user behavior or feedback, leading to a lag in adapting interactions. Static responses fail to maintain engagement as they do not evolve based on ongoing user inputs and interaction patterns. Many systems are designed to handle only one mode of communication, such as text or voice, but not both simultaneously. Some systems process different modalities separately without integrating them, leading to disjointed user experiences.

Further, user experience handling only one modality or having separate processing pipelines results in fragmented interactions, reducing the overall coherence and engagement of the conversation. In limited accessibility systems, users cannot switch seamlessly between modalities based on their preferences or needs, limiting the accessibility and versatility of the system. Data is processed on central servers, which can become bottlenecks under heavy loads. Systems process data in batches rather than in real time, leading to delays. Centralized processing can lead to high latency, especially under peak loads, resulting in slow and unresponsive interactions. Batch processing and centralization limit the system's ability to scale efficiently, affecting performance during high-demand periods. In centralized data storage, user data is often stored and processed on central servers, increasing the risk of data breaches.

Data is protected using standard encryption techniques, but these do not address all privacy concerns, especially when data is centralized. Centralized storage of sensitive data increases the vulnerability to cyber-attacks and unauthorized access. Basic encryption does not provide comprehensive privacy controls, leaving user data potentially exposed to misuse. Basic sentiment analysis tools are sometimes added to systems to gauge user emotions, but these are often superficial. Some systems use scripted responses to simulate empathy, but these lack genuine understanding and adaptability. Basic sentiment analysis tools cannot deeply understand or respond to nuanced emotional cues, leading to ineffective emotional engagement. Robotic interactions are scripted responses that fail to adapt to real-time emotional changes, making interactions feel artificial and disconnected. Systems analyze historical user data to predict future interactions, but these predictions are often simplistic and not real-time. Simple trend analysis techniques identify broad patterns but lack precision in anticipating individual user needs. Historical data analysis alone does not account for dynamic changes in user behavior and preferences, leading to inaccurate predictions. Basic trend analysis does not enable truly proactive engagement, as it reacts to past data rather than anticipating future needs.

Conventional voice recognition systems face significant technical challenges, particularly in achieving effective personalization and contextual awareness. These systems typically rely on predefined voice datasets, generic language models, and rule-based procedures that attempt to simulate human-like interactions. However, they often fall short in recognizing individual user preferences, unique communication styles, or the nuanced context behind user queries. As a result, interactions with these systems can feel impersonal and static. While some solutions offer basic personalization through user profiles or voice training modules, these features are often limited and lack the capability for continuous learning based on evolving user behavior.

Another key limitation in current voice recognition technologies is their dependence on cloud-based processing to support advanced features. This reliance can lead to latency issues, increased data privacy concerns, and a dependency on uninterrupted internet connectivity. Additionally, these systems commonly struggle to integrate and analyze diverse data types such as multimedia content, emails, and text messages thereby reducing their capacity to provide contextually rich and relevant responses.

In the broader domain of conversational machine learning and voice recognition, existing devices also rely heavily on generic datasets and fixed response mechanisms. This approach results in interactions that lack depth and adaptability. The inability to recognize and adjust to users' specific voice patterns or preferences further diminishes the quality of engagement. Furthermore, many systems do not include mechanisms for continuous improvement, making it difficult for them to evolve over time in response to new inputs and behaviors. The absence of scalable monetization models also restricts access to enhanced personalization features, limiting the value provided to users seeking a more advanced and tailored experience.

As a result, there is a need for a method and a system for adaptive generation of conversational content to facilitate engaging, personalized, secure and dynamic conversations between users by using a virtual voice assistant.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

The system to adaptively generate conversational content with a virtual voice assistant, the system comprising a cloud server configured to host an adaptive conversational content generation service. The system comprises an electronic device configured to implement the virtual voice assistant. In an embodiment, the electronic device comprises a processor; and a memory, communicatively coupled with the processor. In an embodiment, the memory stores processor-executable instructions, which on execution cause the processor to receive a voice input from a first user via a voice interface. In an embodiment, the voice input comprises a query and a wake word associated with the electronic device. In an embodiment, an electronic device transmits a request for access to the adaptive conversational content generation service hosted on the cloud server in response to the query. In an embodiment, an electronic device receives data associated with the first user from a plurality of sources and providing the data to the cloud server. In an embodiment, the data is provided by an input user. In an embodiment, the input user is a living person associated with the first user or the first user themselves. In an embodiment, an electronic device creates a personalized profile associated with the first user based on the received data. In an embodiment, an electronic device generates conversational content in real-time to enable interaction between one or more query users and the virtual voice assistant accessing a trained conversation simulator based on the personalized profile associated with the first user. In an embodiment, the trained conversation simulator utilizes the adaptive conversational content generation service hosted on the cloud server. In an embodiment, an electronic device provides the conversational content to the one or more query users during an interaction with the virtual voice assistant. In an embodiment, during the interaction, the one or more query users provide one or more input queries, and the trained conversation simulator generates the conversational content in real-time in response to the one or more input queries provided by the one or more query users. In an embodiment, an electronic device dynamically adapts the conversational content based on real-time feedback from the one or more query users and one or more interaction patterns within the interaction. In an embodiment, the dynamically adapted conversational content is personalized by the virtual voice assistant and provides an engaging interaction experience. In an embodiment, an electronic device provides dynamically adapted conversational content to the one or more query users during the interaction via the virtual voice assistant.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
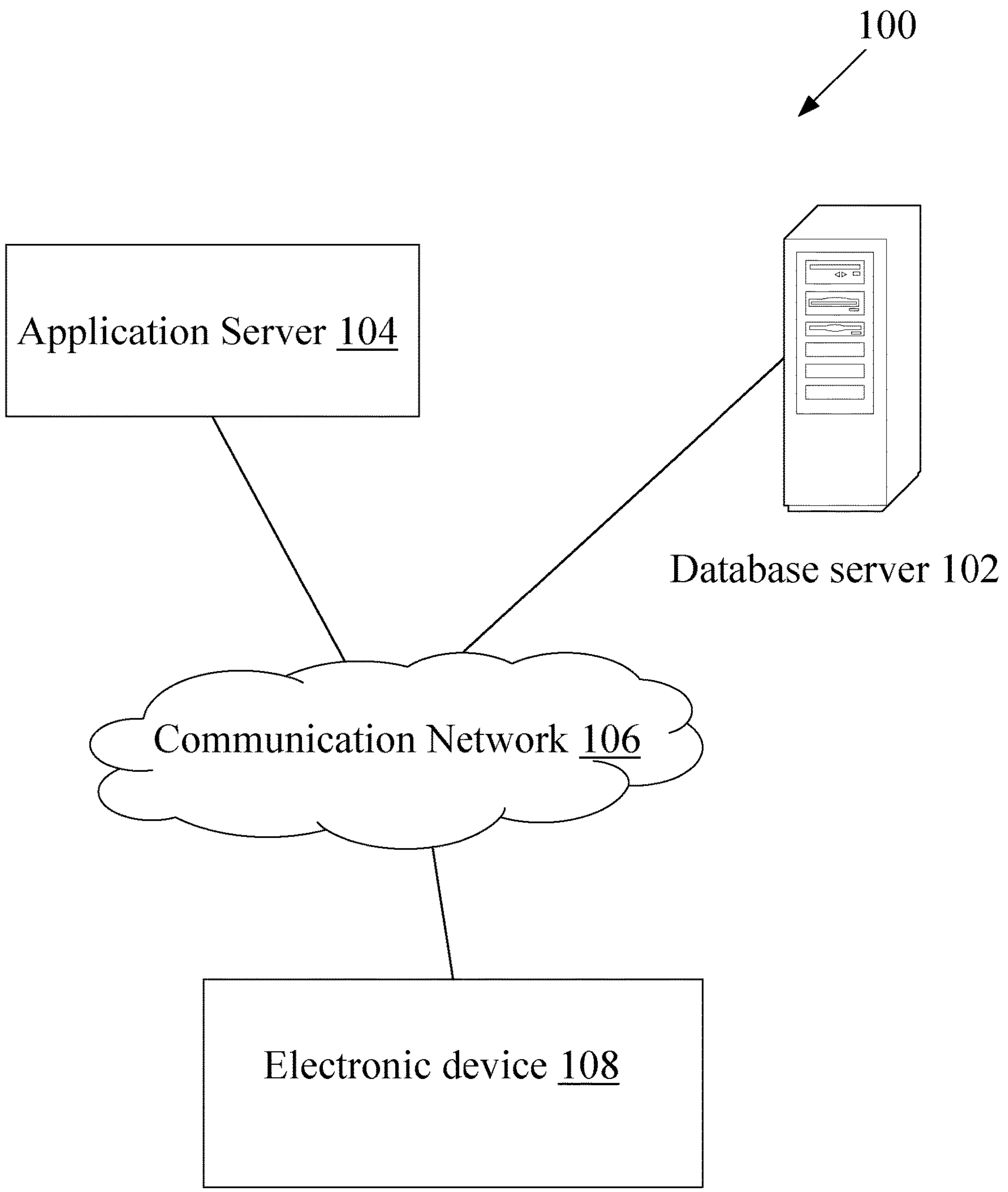
FIG. 1 is a block diagram that illustrates a system environment in which various embodiments of the method and the system may be implemented.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

The primary objectives of the present disclosure are centered on enhancing the quality, personalization, and engagement of conversational interactions between users and digital systems. The present disclosure aims to address several technical challenges faced by conventional systems. Another objective of the present disclosure is to create highly personalized conversational content tailored to individual user preferences, emotional states, and contextual factors. Another objective of the present disclosure is to utilize detailed user profiles derived from diverse data sources, including social media, biometric data, and personal communications. Yet another objective of the present disclosure is to dynamically adapt conversational content in real time based on user feedback and interaction patterns. Yet another objective of the present disclosure is to employ advanced machine learning algorithms to continuously analyze user inputs and adjust responses accordingly, ensuring interactions remain relevant and engaging. Yet another objective of the present disclosure is to integrate multiple communication modalities (text, voice, visual) into a seamless and coherent interaction experience.

Yet another objective of the present disclosure is to develop capabilities to synchronize and process different modalities simultaneously, enhancing accessibility and user engagement. Yet another objective of the present disclosure is to efficiently process large volumes of diverse data in real time for generating and adapting conversational content. Yet another objective of the present disclosure is to create emotionally engaging and empathetic conversations that resonate with users on a personal level. Yet another objective of the present disclosure is to integrate sophisticated sentiment analysis and natural language understanding to generate empathetic responses based on real-time emotional cues. Yet another objective of the present disclosure is to provide a mechanism for monetizing the generation and adaptation of conversational content. Yet another objective of the present disclosure is to implement a payment system that allows users to pay for personalized and dynamically adapted conversational services.

The present disclosure pertains to a sophisticated system for the adaptive generation of conversational content, designed to create personalized, dynamic, and engaging interactions between users and digital systems. The data collection unit aggregates data from a wide variety of sources, including image data, voice data, social media posts, emails, personal diaries, and biometric data such as heart rate, galvanic skin response, and facial expressions. Profile creation unit creates personalized profiles for each user based on the collected data, encompassing psychological and behavioral analysis, personality traits, cognitive styles, and individual preferences. The conversation simulator unit generates real-time conversational content on behalf of a first user, utilizing advanced natural language understanding (NLU) and natural language generation (NLG) techniques. The real-time interaction unit facilitates interactions between users, dynamically adapting content based on real-time feedback, contextual cues, and interaction patterns to maintain engagement and relevance. The feedback analysis unit analyzes real-time feedback from user interactions, including biometric data and emotional cues, to continuously refine and adapt conversational content. The predictive modelling unit uses predictive neural network models to anticipate future user interests and preferences based on historical data and contextual information. The customization unit allows users to customize conversation parameters such as tone, pacing, and depth, ensuring that interactions align with individual preferences and emotional needs. The training unit continuously trains the conversation simulator using federated learning techniques, enhancing conversational strategies while preserving user privacy. The payment unit manages transactions related to the generation and dynamic adaptation of conversational content, providing a monetization mechanism for the service. Multi-modal interaction unit enables interactions through multiple modalities, including text, voice, and visual inputs, ensuring a seamless and immersive user experience.

The present disclosure is primarily focused on enhancing the conversational capabilities of voice recognition devices, enabling them to deliver personalized, contextually aware, and human-like interactions. This is achieved through the integration of user-specific data including voice samples, multimedia files, emails, and text messages into advanced machine learning models. These models are designed to analyze and mimic the user's individual communication style and preferences, significantly improving the relevance and engagement of voice-based interactions. The system supports both cloud-based and local processing to address challenges related to latency, data privacy, and continuous connectivity, ensuring more reliable and secure performance.

A critical component of the disclosure is the system's ability to continuously learn and improve. By dynamically updating the user's data profile, the system can evolve and refine its responses over time, leading to more accurate and adaptive interactions. Furthermore, the technology is intended to operate seamlessly across various platforms including smart speakers, smartphones, and wearable devices broadening its usability and ensuring consistent user experience across different environments.

The system also introduces a subscription-based model with tiered service levels, making advanced personalization and premium data analysis features accessible to a wide range of users. The personalized voice assistant leverages a combination of cloud and local resources, advanced natural language processing (NLP), neural networks, and reinforcement learning to create real-time, emotionally intelligent, and context-sensitive conversational outputs. It supports multimodal input, including text, voice, and visual signals, and can be extended to immersive platforms such as augmented reality (AR) and virtual reality (VR). To enhance user trust and data security, the system incorporates privacy-focused features such as federated learning and on-device processing for sensitive information. It also supports offline capabilities to maintain core functionality without active internet access. This architecture enables scalable deployment across various voice-enabled devices while maintaining a high level of adaptability, responsiveness, and personalization.

The present disclosure relates to voice recognition technology and focuses on enhancing the conversational capabilities of voice recognition devices. These devices include smart speakers, smartphones, and wearable technologies that rely on advanced methods and systems to analyze and interpret user input. A key aspect of the disclosure involves enabling these devices to generate personalized and contextually accurate responses, thereby improving the quality of human-computer interaction. The voice recognition functionality also integrates both cloud-based and local processing, allowing for efficient and adaptive performance depending on user needs and environmental constraints. Furthermore, the system includes data integration mechanisms that support continuous learning and improvement of voice recognition accuracy over time.

FIG. 1 is a block diagram that illustrates a system environment 100 in which various embodiments of the method may be implemented. The system environment 100 typically includes a database server 102, an application server 104, a communication network 106, an electronic device 108, smart speaker 108*a* are typically coupled with each other via the communication network 106. The database server, referred to as server 102, serves as a central hub for storing, managing, and processing data essential for the operation of the adaptive conversational content generation system. The database server 102 is designed to securely handle diverse types of user data, including voice inputs, text-based queries, image and video data, biometric information, social media content, and other contextual information. The database server 102 aggregates this data from various sources, such as user-provided inputs, personal profiles, online platforms, and sensor-based feedback, to create comprehensive user profiles. These profiles enable the system to generate highly personalized and contextually relevant conversational content. The server employs advanced storage and retrieval mechanisms, ensuring efficient data access for real-time interactions while maintaining robust security measures to protect user privacy. The database server 102 supports federated learning and distributed data processing, allowing the system to leverage insights across multiple devices and sources without compromising sensitive information. Additionally, the database server 102 plays a critical role in managing communication between the cloud-based adaptive content generation service and local processing capabilities on user devices, ensuring seamless and adaptive functionality.

The database server 102 serves as a critical component in the system for adaptively generating conversational content with a virtual voice assistant. The database server 102 is responsible for securely storing and managing the vast amounts of data required to create and personalize interactions. This data includes user profiles, historical interaction logs, biometric inputs, emotional feedback, and multimodal content such as voice, text, and visual inputs. The database server interfaces with the cloud server hosting the adaptive conversational content generation service, facilitating seamless data retrieval and processing for real-time conversational interactions.

The data stored on the database server 102 originates from diverse sources, including social media, personal diaries, emails, interviews, and online content, uploaded by the first user or associated individuals. Advanced encryption and access control mechanisms ensure that sensitive information remains secure, aligning with privacy regulations. The server is also designed to handle federated learning processes, enabling decentralized training of the conversation simulator across multiple devices without compromising user data privacy. Furthermore, it supports the creation of personalized profiles that integrate psychological and behavioral analyses, empowering the system to tailor conversational content to individual preferences and cognitive styles. The database server 102 ensures uninterrupted access to adaptive conversational content and dynamic updates, by maintaining high availability and robustness facilitating rich and meaningful user interactions in real-time across various devices.

The database server 102 receives data associated with the first user from a multitude of sources. In an embodiment, the data is provided by an input first user and the input user is a living person associated with the first user or the first user himself/herself This database server includes image data, voice data, social media posts, and language preferences. Demographic data and other relevant personal information. Database server collects data from interviews, online social media, acquaintances, personal diaries, and emails. The database server 102 must handle large volumes of diverse data types, necessitating robust storage capabilities and efficient indexing for quick retrieval. The application server 104 utilizes the database to create personalized profiles for the /first user. This involves aggregating and integrating various data points to build a comprehensive profile and storing these profiles in a structured format to facilitate easy access and updates. The database server 102 ensures these profiles are updated in real-time as new data becomes available. The database server 102 generates and adapts real-time content such as real-time data processing capabilities, the database server 102 provides quick access to user profiles and other relevant data required by the conversation simulator. The database server 102 ensures low latency in data retrieval to enable the real-time interaction required for dynamic content adaptation. The database server 102 stores real-time feedback from the one or more query users, which may include biometric data such as heart rate, galvanic skin response, or facial expressions. This feedback data is analyzed to adapt the conversational content dynamically. The database server 102 must efficiently handle the storage and retrieval of this feedback data to enable the application server to personalize and modify the interactions promptly.

In the context of adaptive generation of conversational content, data accumulation, collection, and management play a crucial role in ensuring personalized and contextually relevant interactions. The data is sourced from a variety of inputs, such as text, voice, images, video, and social media posts. Machine learning (ML) models and artificial intelligence (AI) systems manage the data by categorizing and sorting it into meaningful clusters that reflect the behavioral patterns, preferences, and emotional states of the users. Such multi-modal data is then organized and structured through feature extraction techniques, which allow the models to highlight key aspects such as tone, sentiment, and topic relevance. Additionally, the data undergoes continuous refinement and updates as the users interact with the conversation simulator, making the profiles dynamic and increasingly precise over time.

AI and ML models are also responsible for managing the flow of information in real-time, ensuring that the accumulated data is used to generate conversational content that aligns with the needs of the query users. Deep learning models, such as neural networks, analyze this data to identify patterns and trends in user behavior, enabling predictive models to anticipate future preferences. These models also classify and rank incoming data to prioritize real-time feedback, making the interaction more engaging. Further, the data security and privacy concerns are addressed through encryption, anonymization, and federated learning techniques that ensure the conversation simulator is trained on distributed data without compromising user privacy. This entire process of data collection, management, and sorting allows the AI-driven system to become more adept at providing contextually aware, personalized, and emotionally resonant interactions.

The database server 102 stores historical data and contextual cues used by predictive neural network models. The predictive neural network model comprises one of recurrent neural network, long short-term memory, gated recurrent unit and a convolutional neural network. This data helps in anticipating the future interests and preferences of the one or more query users. The predictive models rely on historical data patterns stored in the database to generate proactive conversational content. The database server 102 maintains records of user preferences related to conversation parameters such as tone, pacing, and depth of interaction. The database server 102 also supports storing multilingual data to enable cross-linguistic and cross-cultural interactions. The database server 102 manages the preferences and customizations for personalized content delivery. The database server 102 stores engagement levels and satisfaction scores that serve as rewards for reinforcement learning models. The database server 102 supports federated learning by managing distributed data sources while ensuring user privacy of the one or more query users. Database server 102 stores psychological and behavioral analysis data to tailor content based on personality traits and cognitive styles. The database server 102 also records payment and any other pertinent information from users.

The database server 102 manages transactions for services such as the generation and dynamic adaptation of conversational content. The database server 102 ensures secure and efficient handling of financial data. The database server 102 stores the necessary data to create virtual representations of the first user. The database server 102 integrates with AR/VR environments to provide a 3D immersive experience, enhancing interaction with contextual visual and auditory stimuli. The database server 102 is designed to securely handle diverse types of user data, including voice inputs, text-based queries, image and video data, biometric information, social media content, and other contextual information. The database server 102 serves as a critical component in the system for adaptively generating conversational content with a virtual voice assistant. This data includes user profiles, historical interaction logs, biometric inputs, emotional feedback, and multimodal content such as voice, text, and visual inputs.

The application server 104 is central to the adaptive generation of conversational content, coordinating various processes and ensuring real-time interaction between the one or more query users and the trained conversational simulator. The application server 104 receives data from a variety of sources, including image data, voice data, video data, social media posts, language preferences, demographic data, interviews, social media, news sources, acquaintances, personal diaries, and emails. This diverse data is crucial for building comprehensive user profiles. By using this data, the application server 104 creates personalized profiles for the first user. The application server 104 aggregates and integrates data to reflect users'preferences, behaviors, and characteristics. The application server 104 generates conversational content in real-time, by utilizing a trained conversation simulator that leverages the personalized profiles, by creating content that is relevant and engaging based on the current context and real-time data. The content generation process is designed to facilitate interactions between the one or more query users and the trained conversation simulator and to adapt dynamically to ensure the interaction remains engaging and personalized. The application server 104, during interactions, provides the generated conversational content to the one or more query users, and receives real-time feedback from the one or more query users, including biometric data (e.g., heart rate, galvanic skin response, facial expression analysis). By using this feedback, the application server 104 analyzes and adapts the conversational content dynamically. The application server 104 ensures the content is personalized to match the one or more query users physiological and emotional state. The application server 104 employs predictive neural network models to anticipate the future interests and preferences of the one or more query users based on historical data and contextual cues. In an embodiment, based on the conversational content the predictive neural network utilizes the historical data and the contextual cues for generating predictive replies. For example, if a query user says that "I have lived in large houses all my life, and am now thinking of relocating to New York", then the answer might be that "You should look for Long Island as opposed to the City where you could find a larger home".

The application server 104 proactively generates conversational content that aligns with the evolving needs and preferences of the one or more query users. These predictive capabilities in the application server 104 allow the server to identify patterns and trends in user behavior over time, to create content that is forward-looking and aligned with anticipated user needs. The application server 104 enables the customization of conversations based on input from the one or more query users, and can adjust parameters such as tone, pacing, and depth of interaction to suit their preferences and emotional needs.

The application server 104 analyzes emotional cues from the input and generates responses to enhance empathy and rapport. Additionally, the application server 104 evaluates the sentiment of the inputs in real time. The application server 104 adjusts the tone and style of conversational content to maintain a positive and supportive interaction. The application server 104 facilitates interactions across different languages and cultures. The application server 104 uses natural language understanding (NLU) and natural language generation (NLG) techniques. The application server 104 generates conversational content in multiple languages, enabling cross-linguistic and cross-cultural interactions. The trained conversation simulator, employed by the application server 104, is continuously trained using reinforcement learning models. The application server 104 receives rewards based on user (one or more query users) engagement levels and satisfaction scores. The application server 104 uses federated learning techniques to train the simulator across multiple devices and data sources while maintaining privacy of the one or more query users. The personalized profiles include psychological and behavioral analyses, allowing the application server 104 for tailored content creation based on personality traits, cognitive styles, and individual psychological needs. The application server 104 handles transactions related to the conversational content. The application server 104 may receive payments from the one or more query users for generating and dynamically adapting conversational content. The application server 104 manages billing and payment processing securely. For interactions involving deceased users or virtual representations, the application server 104 creates and displays virtual representations of the first user.

The application server 104 alternatively also referred to as a cloud server, is a pivotal component in hosting the adaptive conversational content generation service. The cloud server 104 is designed to process and analyze user data received from electronic devices, enabling the generation of real-time, personalized conversational content. The cloud server 104 leverages advanced machine learning models, including neural networks and natural language processing (NLP) techniques, to dynamically adapt interactions based on user preferences, emotional cues, and contextual information. Cloud server 104 facilitates the training and continuous improvement of the conversation simulator using reinforcement learning, federated learning, and predictive modeling, ensuring that the system evolves and remains highly engaging. Cloud server 104 integrates with various data sources, such as social media platforms, emails, and real-time feedback, to enrich user profiles while maintaining stringent privacy measures. Additionally, the cloud server supports seamless communication between devices, enabling the virtual voice assistant to function across different platforms and environments. The cloud server 104 scalable architecture ensures high availability, responsiveness, and adaptability to diverse user needs, while also supporting advanced features like cross-linguistic interactions, AR/VR integrations, and proactive content generation.

The communication network 106 facilitates the transmission of data between various sources and the application server 104. Communication network 106 provides the infrastructure for transmitting data between the electronic devices implementing the virtual voice assistant, the cloud server 104 hosting the conversational content generation service, and the database server 102. This network supports bi-directional communication, enabling the flow of queries, user inputs, and feedback from the user side to the cloud server and returning dynamically generated conversational content to the electronic devices in real-time. For the real-time generation and delivery of conversational content, the communication network 106 ensures low-latency transmission of data, allowing the application server 104 to generate and provide conversational content instantaneously. The communication network 106 is configured for providing reliable and continuous data flow to support dynamic content adaptation based on real-time feedback from the one or more query users. In an embodiment, the trained conversational simulator is hosted in a cloud based server and the communication network transfers the necessary conversational content to the electronic device of the one or more query users. In an embodiment, the network's efficiency directly impacts the responsiveness and quality of the interactions. The Communication Network 106 is responsible for transmitting real-time feedback from the one or more query users, including biometric data such as heart rate, galvanic skin response, stress levels, body movements, blood pressure, and facial expressions. The Communication Network 106 ensures that this feedback reaches the application server 104 promptly for dynamic analysis and adaptation of the conversational content. This enables the application server 104 to personalize the interaction based on the one or more query users physiological and emotional state.

The communication network 106 supports the predictive capabilities of the application server 104 by facilitating the exchange of historical data and contextual cues required for predictive neural network models. The communication network 106 ensures that data patterns and trends indicative of one or more query users interests and preferences are transmitted efficiently for proactive content generation. This helps the application server 104 anticipate future needs of the one or more query users and generate relevant conversational content. The communication network 106 supports the customization of interactions by transmitting one or more query users inputs that indicate preferences for conversation parameters such as tone, pacing, and depth. The communication network 106 allows the application server 104 to analyze these inputs and adjust the conversational content accordingly. Additionally, the communication network 106 enables real-time sentiment analysis by transmitting user inputs quickly for immediate evaluation and response adjustment. The communication network 106 supports the transmission of engagement levels and satisfaction scores used in reinforcement learning models. The Communication Network 106 facilitates federated learning by enabling the exchange of training data across multiple devices and data sources while maintaining user (one or more query users) privacy. This ensures that the conversation simulator can learn and improve its strategies without compromising user data security. The communication network 106 also supports monetization aspects by enabling secure transmission of payment data from the one or more query users to the application server. The communication network 106 also ensures reliable and secure processing of transactions related to the generation and dynamic adaptation of conversational content. The communication network 106 supports the transmission of data necessary for creating and displaying virtual representations of the first user/deceased user. Communication network 106 provides the infrastructure for transmitting data between the electronic devices implementing the virtual voice assistant.

The communication network 106 also supports hybrid processing, where the system dynamically switches between local and cloud-based processing depending on network availability and computational requirements. This ensures uninterrupted service even in offline or low-connectivity scenarios. Furthermore, the network's security features, such as encrypted communication channels and secure data transmission protocols, protect sensitive user data during interactions. The communication network's 106 scalability enables the system to support numerous simultaneous users across various devices, making it a critical enabler for delivering adaptive, AI-driven conversational content across a wide range of applications.

The electronic device 108, which can be a smartphone, tablet, smart watch, computer, or any other internet-connected device, is a crucial component in the adaptive generation of conversational content. The electronic device can encompass a wide range of hardware, including smartphones, smart speakers, laptops, wearable devices, smart appliances, and other gadgets equipped with voice recognition capabilities. This device serves as the primary interface through which the one or more query users interact with the application server using the virtual voice assistant and access the generated conversational content. The electronic device 108 collects and transmits data about the deceased user/first user including image data, voice data, and social media posts. The electronic device 108 also collects user preferences, demographic data, and other relevant personal information. Inputs from interviews, videos, still digital images, personal diaries, emails, and other communications. This data is sent to the application server to create comprehensive personalized profiles for the first user. The electronic device 108 is essential for facilitating real-time interactions by displaying the generated conversational content to the one or more query users, by allowing the one or more query users to provide input conversations during the interaction, by ensuring that the conversation feels natural and engaging by leveraging the device's capabilities (e.g., touchscreen, microphone, and camera). The electronic device 108 can capture and transmit real-time feedback from the one or more query users, including biometric data such as heart rate, galvanic skin response, stress levels, blood pressure, and facial expressions using built-in sensors or connected wearable devices, emotional cues and user responses that are analyzed by the application server to adapt the conversational content dynamically.

The electronic device 108 allows the one or more query users to customize their interactions by providing inputs that indicate preferences for conversation parameters such as tone, pacing, and depth of interaction, by enabling sentiment analysis by capturing real-time emotional cues through text, voice, and facial expressions. The electronic device 108 ensures that these inputs are quickly transmitted to the application server 104 for immediate content adaptation.

The electronic device 108 supports multilingual and cross-cultural interactions by displaying conversational content generated in multiple languages, by utilizing the device's language settings and input methods to facilitate communication across different languages and cultural contexts. The electronic device 108 helps anticipate user (one or more query users) needs by storing historical interaction data and contextual cues, by sending this data to the application server, which uses predictive neural network models to generate content aligned with the one or more query users evolving preferences and interests. The electronic device 108 plays a role in the continuous improvement of the conversation simulator by collecting engagement levels and satisfaction scores from user interactions, by transmitting this data to the application server to refine conversational strategies using reinforcement learning models. The electronic device 108 facilitates monetization by enabling secure payment transactions for services related to conversational content generation and adaptation, by ensuring user data privacy and security during financial transactions.

The electronic device 108 is designed to process user inputs, such as voice commands and queries, and deliver personalized conversational content generated by the cloud server 104. Equipped with a processor and memory, the electronic device 108 executes software instructions that facilitate key functionalities, including receiving voice inputs with wake words, transmitting queries to the cloud server, and presenting responses to users. The device also supports multimodal interactions, allowing users to engage through text, voice, and visual displays, enhancing the overall interaction experience.

Equipped with a processor and memory, the electronic device 108 executes software instructions that facilitate key functionalities, including receiving voice inputs with wake words, transmitting queries to the cloud server, and presenting responses to users. The device also supports multimodal interactions, allowing users to engage through text, voice, and visual displays, enhancing the overall interaction experience. Advanced features, such as local processing capabilities, enable the device to perform partial data analysis and voice recognition tasks independently, ensuring functionality even in offline scenarios. The electronic device 108 integrates seamlessly with cloud-based services to access advanced AI-driven capabilities, such as real-time adaptation of conversational content, sentiment analysis, and predictive personalization. The electronic device 108 dynamically switches between local and cloud-based processing based on network conditions, computational requirements, and user preferences. Additionally, the electronic device can support biometric data collection, such as heart rate, facial expressions, or galvanic skin responses, which are transmitted securely to the cloud for further personalization of interactions.

The versatility and scalability of the electronic device 108 make it central to delivering adaptive, engaging, and context-aware conversational experiences. The electronic device's 108 integration with subscription-based models further enables monetization and supports additional premium features, such as enhanced personalization or immersive augmented reality (AR) and virtual reality (VR) capabilities, to provide a holistic and user-centric interaction platform.

Smart speaker 108*a* employs a continual learning framework to adaptively refine its underlying machine learning models based on user interactions over time. The virtual voice assistant is provided within the smart speaker 108*a*. Each time the user engages with the smart speaker whether by issuing a voice command, responding to prompts, or uploading new personal data such as emails, calendar updates, photos, or text messages the system extracts contextual and semantic features from the new inputs. These features are then used to incrementally update the user profile and retrain portions of the personalized language and behavior prediction models. The system may use techniques such as online learning, federated learning, or differential model fine-tuning to update specific model parameters without requiring full retraining, thereby maintaining high performance while preserving responsiveness and data efficiency. Updates may be performed locally for routine adjustments or queued for asynchronous processing on the cloud server for more computationally intensive refinements. The updated models are version-controlled and periodically validated to ensure they maintain alignment with the user's evolving communication patterns, emotional tone, and content preferences. This adaptive feedback mechanism enables the system to become progressively more personalized and context-aware, delivering increasingly relevant, human-like interactions with minimal manual configuration.

Figure 2:
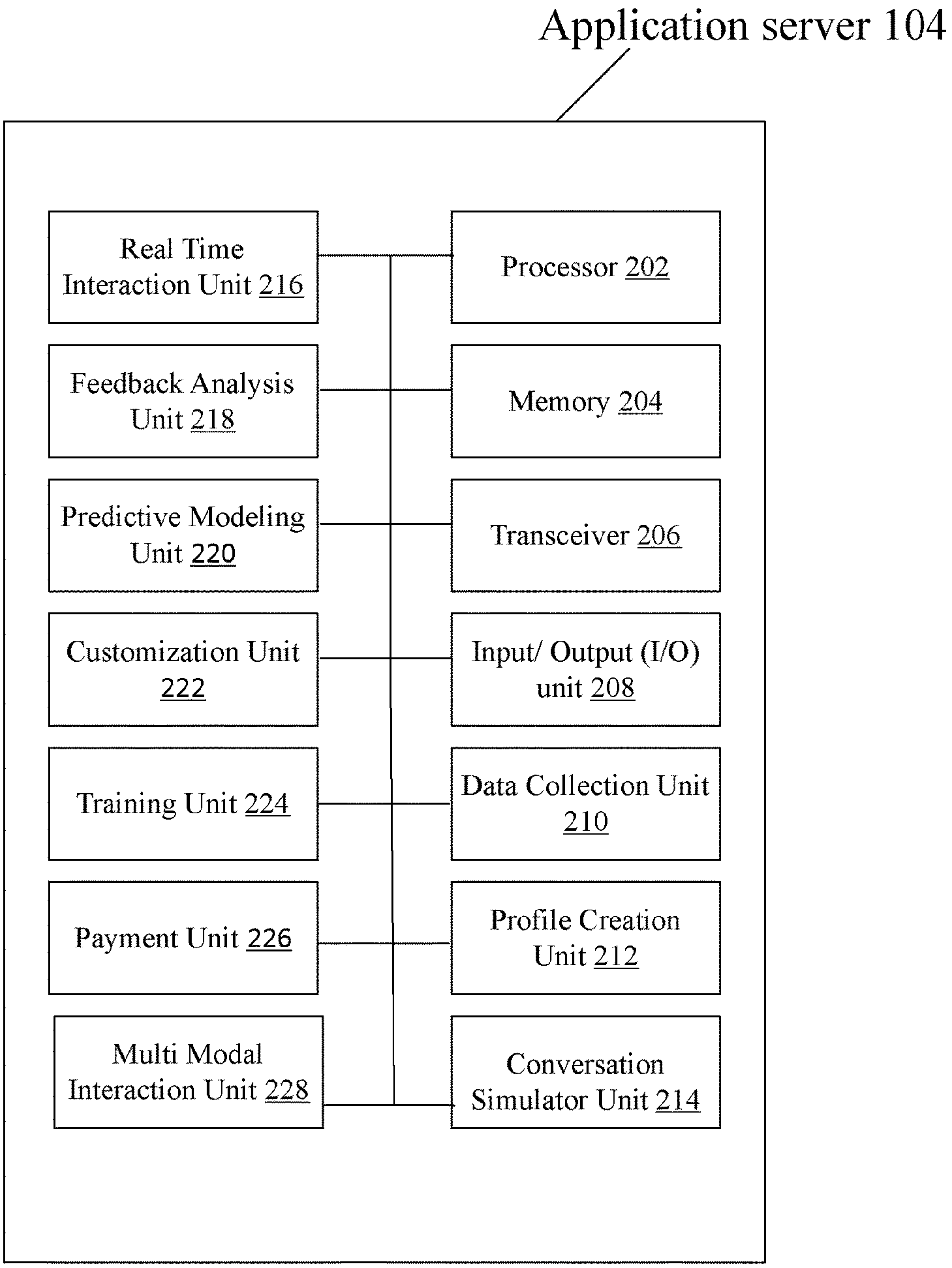
FIG. 2 is a block diagram that illustrates a cloud server configured to adaptively generate conversational content, in accordance with an embodiment of present disclosure.

FIG. 2 is a block diagram that illustrates an application server 104 configured to adaptively generate conversational content, in accordance with an embodiment of the present invention. FIG. 2 is explained in conjunction with elements from FIG. 1. Here, the cloud server or alternatively referred to as application server 104 preferably includes a processor 202, a memory 204, a transceiver 206, an input/output unit 208, and a Data collection unit 210, a Profile creation unit 212, a Conversation simulator unit 214, Real Time Interaction unit 216, Feedback analysis unit 218, Predictive Modeling unit 220, Customization unit 222, Training unit 224, Payment unit 226, Multi Modal Interaction unit 228, Emotional intelligence unit 230, and Multilingual support unit 232.

The Processor 202 comprises suitable logic, circuitry, interfaces, and/or code that may be configured to execute a set of instructions stored in memory 204, and may be implemented based on several Processor 202 technologies known in the art. The processor 202 works in coordination with the transceiver 206, an input/output unit 208, and Data collection unit 210, a Profile creation unit 212, a Conversation simulator unit 214, Real Time Interaction unit 216, Feedback analysis unit 218, Predictive Modeling unit 220, Customization unit 222, Training unit 224, Payment unit 226, Multi Modal Interaction unit 228, Emotional intelligence unit 230, and Multilingual support unit 232. Examples of the processor 202 include, but not limited to, an X86-based processor, a Reduced Instruction Set Computing (RISC) processor, an Application-Specific Integrated Circuit (ASIC) processor, and a Complex Instruction Set Computing (CISC) processor, for example.

The memory 204 comprises suitable logic, circuitry, interfaces, and/or code that may be configured to store the set of instructions, which are executed by the processor 202. Preferably, the memory 204 is configured to store one or more programs, routines, or scripts that are executed in coordination with the processor 202. Additionally, the memory 204 may be implemented based on a Random access memory (RAM), a Read-Only Memory (ROM), a Hard Disk Drive (HDD), optical memory storage, a storage server, and/or a Secure Digital (SD) card.

The transceiver 206 comprises suitable logic, circuitry, interfaces, and/or code that may be configured to obtain one or more attributes associated with an application server. The Transceiver 206 enables wireless communication capabilities, allowing the device to connect to Wi-Fi networks, Bluetooth-enabled devices, or cellular networks. This connectivity facilitates data exchange, firmware updates, and remote configuration. The Transceiver 206 serves as the interface for transmitting and receiving data packets over wireless networks. This includes exchanging information with other devices, accessing online resources, and transferring data to and from remote servers. The transceiver 206 supports various network protocols and standards, ensuring compatibility with different communication technologies. This versatility enables seamless integration with existing network infrastructures. The transceiver 206 may offer adjustable transmission power and bandwidth settings, allowing the device to optimize communication range and data transfer speeds based on environmental conditions and network requirements. The transceiver 206 incorporates security features such as encryption, authentication, and data integrity checks to ensure secure communication over wireless networks. This protects sensitive information and prevents unauthorized access. The transceiver 206 could be implemented as a hardware module within the electronic device 106, comprising radio frequency (RF) components, antennas, and signal processing circuitry. Alternatively, it could be integrated into the device's system-on-chip (SoC) or as a separate module connected via interfaces such as USB or PCIe.

The Input/Output unit 208 includes components such as buttons, touchscreens, or touchpads that serve as user interfaces for interacting with the device. These interfaces enable one or more query users to input commands, initiate actions, and navigate menus. A display screen, such as an LCD or OLED panel, is part of the Input/Output unit 208 and provides visual feedback to the user. The Input/Output unit 208 displays decoded information, user notifications, augmented reality (AR) overlays, and other graphical elements. The Input/Output unit 208 could be implemented as a combination of hardware components, including buttons, touchscreens, speakers, microphones, and ports, integrated into the device's physical design. Additionally, software components would interface with these hardware elements to manage input/output unit 208 operations and user interaction. The input/output unit 208 comprises of various input and output devices that are configured to communicate with the processor 202. Examples of the input devices include but are not limited to, a keyboard, a mouse, a joystick, a touch screen, a microphone, a camera, and/or a docking station. Examples of the output devices include, but are not limited to, a display screen and/or a speaker.

The data collection unit 210 may include suitable logic, circuitry, interfaces, and/or code that may be configured to aggregate data from a wide array of sources, including personal data which includes image data, voice data, video data, social media posts, personal diaries, news sources, and emails, behavioral data which further includes language preferences, demographic information, user interactions on social media. The collection unit also collects information from interviews, details provided by acquaintances, and historical data. By integrating data from these varied sources, the unit ensures a holistic view of the preferences, behaviors, and characteristics of the first user/deceased user are captured. In an embodiment, the data is provided by an input user and the input user is a living person associated with the first user. For example, the input user may be a living family member of the first/deceased user. In another embodiment, the input user may be the first user themselves. In another embodiment, the input user may be a living person associated with the first user or the first user himself or herself i.e., the first user is not deceased and the first user themselves provides the information about themselves to the data collection unit 21. The collected data is used to create personalized profiles for the first user who in this embodiment is a deceased user. These profiles include demographic information such as age, gender, photo imaging, location, etc. These profiles also include psychological and behavioral analyses of personality traits, cognitive styles, and individual psychological needs. These profiles collect preferences and interests based on social media activity, language use, and other contextual information.

The data collection unit 210 also gathers real-time data during user interactions which includes biometric data such as heart rate, galvanic skin response, blood pressure, stress levels, and facial expression analysis, and Interaction patterns such as user inputs, engagement levels, and emotional responses during conversations. This real-time data is crucial for dynamically adapting the conversational content to keep it relevant and engaging. The real-time data anticipates future needs and preferences of the one or more query user. The data collection unit 210 supports historical data analysis using past interactions and behavioral patterns to predict future interests. These predictive capabilities enable the proactive generation of conversational content that aligns with the one or more query users evolving needs. The data collection unit 210 captures user inputs that customize the conversational experience, such as tone and pacing preferences and user-specified parameters for how conversations should be conducted. The data collection unit evaluates the sentiment and emotional state of the one or more query users by analyzing input text, voice, and facial expressions for emotional cues.

The data collection unit 210 is configured to adjust conversational content to enhance empathy and rapport based on the one or more query users emotional state. In an embodiment, the input user may also be a query use. The data collection unit 210 supports cross-linguistic and cross-cultural interactions by language preferences collecting and processing data in multiple languages, cultural context by understanding cultural nuances to generate appropriate conversational content, training data for reinforcement learning to improve the conversation simulator. The data collection unit 210 gathers, engagement metrics user satisfaction scores and interaction feedback. The data collection unit 210 use behavioral rewards in reinforcement learning models to refine conversational strategies. The data collection unit 210 employs federated learning techniques to ensure privacy training models across multiple devices and data sources without compromising user privacy. Further, the data collection unit 210 is configured to provide data security by implementing robust security measures to protect user data during collection and transmission.

The data collection unit 210 is a fundamental component of the system, responsible for gathering and aggregating a wide variety of data inputs to support the personalization and adaptation of the virtual voice assistant's interactions. This Data Collection unit 210 collects data from multiple sources, including voice inputs, image and video data, social media posts, emails, demographic information, and more. The data collection unit 210 can capture both explicit data, such as user queries and preferences, and implicit data, including interaction patterns and environmental context. The data collection unit 210 ensures that this information is organized and processed effectively, enabling the system to build and continuously update personalized user profiles. the data collection unit 210 allows the system to adapt to the unique needs, behaviors, and preferences of individual users, enhancing the relevance and engagement of conversations, by gathering data from diverse sources. This data collection unit 210 also plays a key role in feeding the profile creation unit 212 and the real-time conversation Simulator with up-to-date data, enabling the system to provide tailored, context-aware responses in real time. Additionally, the data collection unit 210 works within privacy and security frameworks, ensuring that user data is collected and managed in compliance with applicable regulations and safeguarding user confidentiality.

Profile Creation Unit 212 is a fundamental component within the system for the adaptive generation of conversational content. The Profile Creation Unit 212 may include suitable logic, circuitry, interfaces, and/or code that may be configured for synthesizing data from various sources to build detailed and personalized user profiles, which serve as the foundation for generating relevant and engaging conversational content. The Profile Creation Unit 212 integrates data from multiple sources to form comprehensive user profiles. These sources include personal data such as image data, voice data, social media posts, video data, language preferences, and demographic data. The Profile Creation Unit 212 utilizes contextual data information from interviews, online social media, information from acquaintances, personal diaries, and emails for profile creation. Also, behavioral data, historical interaction patterns, user preferences, and engagement levels are utilized for profile creation. This holistic data integration ensures that the profiles are rich and detailed.

The Profile Creation Unit 212 synthesizes the collected data to create personalized profiles that encompass various aspects of the first user/deceased user and the one or more query users, including demographic information age, gender, location, and other basic details. The Profile Creation Unit 212 further uses past interactions, including conversation topics, user responses, and engagement metrics to create profiles of the first user. The profile creation unit continuously updates the user profiles based on real-time data during interactions. This includes biometric data incorporating physiological data such as heart rate, blood pressure, stress levels, galvanic skin response, and facial expressions. The profile creation unit is configured to utilize interaction feedback to adjust profiles based on user inputs, engagement levels, and emotional responses during ongoing conversations. These updates ensure that the profiles reflect the current state and preferences of the users. The profile creation unit uses predictive modelling to anticipate the future interests and preferences of the users by examining past interactions and behavioral patterns, by considering current situational factors and contextual information. This predictive capability allows the system to proactively generate content that aligns with the evolving needs of the users.

The profile creation unit incorporates user inputs for customization into the profiles, such as user preferences for the style and speed of conversations. These customization options help tailor the interactions to individual user preferences. The profile creation unit evaluates and incorporates the emotional state and sentiment of the users into their profiles by assessing text, voice, and facial expressions for emotional indicators. By adjusting profiles based on the user's current emotional state and responses during interactions ensures that the conversational content is empathetic and supportive. The profiles include information relevant to multilingual and cross-cultural interactions, preferred languages for communication, cultural nuances and norms that may affect conversation. This allows the system to generate appropriate and effective conversational content across different languages and cultures. The profile creation unit contributes to the training data used in reinforcement learning models by providing data on user satisfaction and engagement levels, by identifying successful conversational strategies based on historical interactions. This data is used to continuously improve the conversation simulator's performance. The profile creation unit employs federated learning techniques to train models using decentralized data to avoid compromising user privacy. The profile creation unit employs federated learning techniques to implement robust security measures to safeguard user data during profile creation and updates.

The profile creation unit is a fundamental component within the system for the adaptive generation of conversational content. The profile creation unit is responsible for synthesizing data from various sources to build detailed and personalized user profiles, which serve as the foundation for generating relevant and engaging conversational content. The profile creation unit integrates data from multiple sources to form comprehensive user profiles. These sources include image data, voice data, social media posts, language preferences, demographic data, and information from interviews, online social media and information from acquaintances, personal diaries, emails, historical interaction patterns, user preferences, and engagement levels. This holistic data integration ensures that the profiles are rich and detailed. The predictive capability using machine learning and artificial intelligence allows the system to proactively generate content that aligns with the evolving needs of the users. The unit incorporates user inputs for customization into the profiles, such as user preferences for the style and speed of conversations. These customization options help tailor the interactions to individual user preferences.

Profile creation unit 212 is a vital component of the adaptive conversational content generation system, tasked with creating and maintaining a personalized profile for the first user. Profile creation unit 212 processes data collected by data collection unit 210, including multimodal inputs such as voice recordings, text, images, videos, social media activity, and biometric data. The personalized profile serves as the foundation for tailoring conversational content, enabling the virtual voice assistant to deliver contextually relevant and engaging interactions. Profile creation unit 212 analyzes the collected data to extract meaningful insights about the first user's personality traits, preferences, cognitive styles, and emotional states, using advanced machine learning techniques. Profile creation unit 212 integrates these insights with historical interaction data, demographic information, and behavioral patterns to build a holistic and dynamic profile. For deceased users, The Profile creation unit 212 incorporates data provided by living individuals, such as acquaintances or family members, to create an accurate representation of the user's personality and conversational style. Profile creation unit 212 employs predictive algorithms to anticipate future interests and evolving needs based on patterns and trends identified in the user's data. This proactive approach ensures that conversational content remains relevant and adaptive over time. Profile creation unit 212 also supports psychological and behavioral analyses, allowing the system to craft interactions that align with the user's unique traits and emotional requirements. The personalized profiles generated by the profile creation unit 212 are stored securely on the database server 102 and leveraged by the cloud server 104 to generate real-time conversational content. Profile creation unit 212 ensures that the virtual voice assistant can provide an ever-evolving, personalized interaction experience that meets the user's preferences and needs, by continuously updating the profiles with real-time feedback and new data.

The real-time conversation simulator unit 214 is the central engine driving dynamic and adaptive interactions between users and the virtual voice assistant. The real-time conversation simulator unit 214 leverages advanced natural language understanding (NLU) and natural language generation (NLG) techniques to process input queries and generate contextually relevant responses in real time. The real-time conversation simulator unit 214 integrates data from the personalized profile of the user, utilizing insights from the profile creation unit 212 to tailor conversational content based on individual preferences, emotional states, and cognitive styles. The simulator dynamically adapts the tone, pacing, and depth of interactions to align with the user's evolving needs, providing a seamless and engaging conversational experience. Additionally, Profile creation unit 212 employs predictive modeling to anticipate future interests and preferences, further enhancing the interaction. Profile creation unit 212 is equipped with multi-modal capabilities, enabling communication through voice, text, and visual displays, and the profit creation unit 212 supports multilingual interactions to cater to diverse audiences. With the inclusion of machine learning and reinforcement learning models, the simulator continuously improves its conversational strategies by analyzing feedback, engagement levels, and user satisfaction, ensuring a natural, empathetic, and personalized dialogue.

The conversation simulator unit 214 may include suitable logic, circuitry, interfaces, and/or code that may be configured to generate conversational content in real time to facilitate interactions between the one or more query users and the trained conversational simulator. The conversation simulator unit 214 may utilize the personalized profiles created for each user to tailor responses that align with their preferences, interests, and behavioral patterns. The conversation simulator unit 214 is configured to adjust the generated conversational content based on live feedback and interaction patterns to maintain relevance and engagement. The conversation simulator unit 214 leverages diverse data sources, to generate conversational content, including detailed profiles containing demographic, psychological, behavioral information, current context, live events, news updates, and user-specific information to ensure the conversational content is pertinent and timely. The conversation simulator unit 214 employs predictive neural network models to anticipate future interests and preferences of users by examining past interactions and behaviors to identify patterns and trends, and by considering real-time contextual information to forecast user needs and proactively generate appropriate conversational content. The simulator allows customization based on inputs from one or more query users, such as adapting the tone, pacing, and depth of the interaction to match user preferences, evaluating emotional inputs from the one or more query users and adjusting responses to enhance empathy and rapport.

The conversation simulator unit 214 supports multilingual and cross-cultural interactions by using natural language understanding (NLU) and natural language generation (NLG) techniques to generate conversational content in multiple languages, by incorporating cultural nuances to ensure the conversational content is appropriate and effective across different cultural contexts. The simulator employs reinforcement learning models to continuously improve its conversational strategies by receiving rewards based on user engagement levels and satisfaction scores. The conversation simulator unit 214 is configured to adjust strategies and responses based on ongoing interactions to enhance performance over time. To ensure privacy and security, the conversation simulator unit 214 utilizes federated learning techniques by training models across multiple devices and data sources without aggregating sensitive user data centrally. The conversation simulator unit 214 by maintaining user data privacy while enhancing the simulator's capabilities through distributed learning processes. The simulator dynamically adapts the conversational content based on real-time feedback from users by monitoring user inputs, engagement, and emotional responses during interactions. By modifying the content on the fly to maintain a positive and engaging user experience, the conversation simulator unit 214 supports various interaction modes, including enabling multi-modal interactions to cater to user preferences. The conversation simulator unit 214 can facilitate a range of interactions, such as providing simulated conversations for emotional support, especially in scenarios where the first user might be deceased or by engaging users through educational content or entertainment-based interactions.

The real-time interaction unit 216 is a crucial component within the system for the adaptive generation of conversational content. It facilitates live, dynamic interactions between the one or more query users and the trained conversational simulator, ensuring that the conversational content is responsive, engaging, and contextually appropriate. The real-time interaction unit 216 processes incoming data from user interactions instantaneously, including capturing text, voice, and visual inputs provided by users during the interaction, by incorporating physiological data such as heart rate, galvanic skin response, and facial expressions to gauge the user's emotional and physiological state. The real-time interaction unit 216 adapts the conversational content on the fly based on real-time feedback and interaction patterns, including continuously analyzing responses from the one or more query users and engagement levels to modify the content accordingly. The real-time interaction unit 216 is configured to identify patterns within the interaction to tailor responses and maintain an engaging dialogue. The real-time interaction unit 216 monitors user engagement levels by assessing the emotional tone and sentiment of user inputs through natural language processing (NLP) and emotional analysis techniques. The real-time interaction unit 216 by tracking metrics such as response time, frequency of interactions, and user satisfaction scores can enhance the conversational experience.

The real-time interaction unit 216 adjusts content based on the user's (one or more query users) emotional state by evaluating the sentiment of user inputs to determine their emotional tone, by modifying the tone and style of responses to be empathetic and supportive, fostering a positive interaction. The real-time interaction unit 216 supports user-driven customization by allowing users (one or more query users) to set preferences for tone, pacing, and depth of interaction, by generating responses that align with the user's individual preferences and emotional needs. The real-time interaction unit 216 ensures that the conversational content is suitable for users (one or more query users) from diverse linguistic and cultural backgrounds by utilizing natural language understanding (NLU) and natural language generation (NLG) to support multiple languages. The real-time interaction unit 216 by generating conversational content that aligns with anticipated user needs, ensures that the conversation remains engaging and forward-looking. The real-time interaction unit 216 incorporates reinforcement learning techniques to continuously improve its performance by using real-time user feedback to refine conversational strategies. The real-time interaction unit 216 is further configured to adjust responses based on engagement levels and satisfaction scores to optimize user experience. To protect user (one or more query users) privacy, the real-time interaction unit 216 employs federated learning and secure data handling practices by training models across multiple devices without aggregating sensitive data centrally. The real-time interaction unit 216 is configured to ensure that user data is processed securely and in compliance with privacy regulations. The real-time interaction unit 216 is versatile and can be applied in various scenarios, such as facilitating conversations that provide emotional support, particularly in cases where one user is deceased, by engaging users through educational content or interactive entertainment experiences.

The feedback analysis unit 218 plays a crucial role in the system for the adaptive generation of conversational content. The feedback analysis unit 218 processes user feedback in real time to understand user preferences, engagement levels, and emotional responses, thereby enabling the system to dynamically adapt and optimize conversational interactions. The feedback analysis unit 218 continuously processes user feedback during conversational interactions, including analyzing text, voice, and visual inputs provided by users during conversations. The feedback analysis unit 218 by incorporating physiological signals such as heart rate, galvanic skin response, stress levels and facial expressions to assess the one or more query users emotional state. The feedback analysis unit 218 monitors various engagement metrics to gauge the effectiveness of the conversational content, including assessing the time taken by users to respond to prompts or messages, tracking the frequency and duration of interactions to measure user engagement, and collecting user ratings and feedback to evaluate the overall satisfaction with the conversation. The feedback analysis unit 218 is configured to understand the emotional responses of users (one or more query users) and the feedback analysis unit 218 is configured for assessing the sentiment and emotional tone of user inputs using natural language processing (NLP) techniques.

The feedback analysis unit 218 identifies emotional cues from facial expressions, voice intonation, and other nonverbal signals. The feedback analysis unit 218 by analyzing feedback, the unit identifies user preferences and behavior patterns, including recognizing topics of conversation styles that resonate with the user. The feedback analysis unit 218 understands the user's preferred tone, pacing, and depth of interaction. Based on feedback analysis, the feedback analysis unit 218 dynamically adapts and optimizes the conversational content by adjusting the tone, style, and content of responses to align with user preferences and emotional states. The feedback analysis unit by tailoring interactions to individual user profiles and past feedback enhances relevance and engagement. The feedback analysis unit 218 incorporates predictive modelling techniques to anticipate future user needs and preferences by identifying trends and patterns in user feedback to predict future behavior. The feedback analysis unit 218 is configured for generation of conversational content that anticipates one or more query users interests and maintains engagement over time.

The feedback analysis unit 218, leveraging feedback analysis, contributes to the continuous improvement of the conversation simulator by using feedback to refine conversational strategies and improve user satisfaction. Further, by incorporating user feedback as rewards in reinforcement learning models the conversational performance is further optimized. The feedback analysis unit is configured to ensure user privacy and data security and adhere to strict privacy measures by including processing feedback data without storing personally identifiable information. The feedback analysis unit 218 implements encryption and access controls to protect sensitive user data.

The feedback analysis unit 218 is a critical component of the system that ensures the continuous improvement and personalization of interactions between users and the virtual voice assistant. The feedback analysis unit 218 is designed to process real-time feedback collected during interactions, analyzing various parameters such as user engagement levels, preferences, and emotional responses. Feedback data may include explicit input from users, such as ratings or comments, as well as implicit signals like biometric data (e.g., heart rate, galvanic skin response, or facial expressions) and interaction patterns. The feedback analysis unit 218 identifies trends, detects emotional cues, and evaluates user sentiment, enabling the system to adapt to conversational content dynamically, by leveraging advanced machine learning models. The feedback analysis unit 218 works closely with other components, such as the predictive modeling unit 218 and the real-time conversation simulator 218, to refine responses, adjust tone and style, and enhance overall user satisfaction. Its ability to analyze feedback comprehensively ensures that the system remains engaging, empathetic, and aligned with the evolving needs of users.

The predictive modelling unit 220 plays a central role in the system for the adaptive generation of conversational content. The predictive modelling unit 220 by leveraging historical data and contextual cues, anticipates future user needs and preferences, enabling proactive content generation and enhancing the overall conversational experience. The predictive modelling unit 220 analyzes historical user interactions and behavioral patterns to identify trends and preferences. The unit 220 examines past conversations by studying previous dialogues and user responses to understand recurring topics and engagement levels, by analyzing feedback data, including satisfaction scores and ratings, to assess user preferences and satisfaction with past interactions. In addition to historical data, the unit incorporates real-time contextual cues to anticipate future user needs. This includes monitoring current events, news updates, and other situational factors that may influence user interests, by considering the user's current context, location, and recent activities to tailor conversational content accordingly. The unit 220 by identifying patterns and correlations within the data, the predictive modelling unit can predict future user behavior. The unit 220 generates conversational content proactively, using insights from historical data and predictive analysis. This involves crafting responses that anticipate and address potential user needs before they are explicitly expressed. The predictive modelling unit 220 is configured for designing content to maintain user interest and engagement over time by aligning with predicted preferences. The predictive modelling unit 220 continuously learns from user interactions to refine its predictive capabilities and optimize content generation.

The predictive modeling unit 220 is a sophisticated component of the adaptive conversational system, designed to anticipate user needs, preferences, and future interests based on historical data and contextual cues. The predictive modeling unit 220 employs advanced predictive analytics and neural network models to identify patterns and trends in user behavior, preferences, and interaction history. The predictive modeling unit 220 generates insights into the user's evolving needs and interests, the predictive modeling unit 220. These insights enable the system to proactively generate conversational content that aligns with the anticipated requirements of the user, providing a seamless and intuitive interaction experience. Integrated with the Real-Time conversation simulator, the predictive modeling unit 220 ensures that responses are not only contextually relevant but also forward-looking, enhancing the system's ability to maintain engaging and meaningful dialogues. The predictive modeling unit 220 capability to predict and adapt to user dynamics makes it a cornerstone for delivering personalized and forward-thinking conversational experiences.

The predictive modeling unit 220 is a crucial component of the system, responsible for incorporating machine learning models and algorithms into various functional aspects of the virtual voice assistant. The predictive modeling unit 220 enables the system to continuously learn and improve its performance by integrating data from user interactions, feedback, and contextual information. The predictive modeling unit 220 utilizes supervised learning, unsupervised learning, reinforcement learning, and deep learning techniques to enhance the system's ability to understand user inputs, predict preferences, and generate personalized responses. The predictive modeling unit 220 works synergistically with other components, such as the real-time conversation simulator, feedback analysis unit, and predictive modeling unit, to refine conversational strategies and improve engagement. The predictive modeling unit 220 allows the virtual voice assistant to adapt to evolving user needs, identify patterns in behavior, and optimize content generation for better user experiences, by incorporating machine learning techniques. Additionally, the predictive modeling unit 220 ensures that the system can process and interpret diverse data types, such as voice, text, and visual inputs, enabling it to provide more accurate and contextual relevant interactions across different modalities. The customization unit 222 is a pivotal component within the system for the adaptive generation of conversational content. It enables the one or more query users to tailor their conversational experiences with the trained conversational simulator according to their individual preferences, ensuring that interactions are personalized, engaging, and relevant. The customization unit 222 processes user input to understand their customization preferences. This includes analyzing user-provided parameters such as tone, pacing, and depth of interaction, by identifying emotional cues from user inputs to tailor responses accordingly. By analyzing user inputs and historical data, the customization unit 222 identifies user preferences and customization patterns, including by recognizing preferred conversational tones (e.g., formal, casual) and styles (e.g., humorous, informative). Based on user preferences, the customization unit dynamically adapts the conversational content by modifying the tone and style of responses to match user preferences, ensuring consistency and resonance. The customization unit 222 is configured to adjust the speed and rhythm of interactions to align with the user's preferred pacing. The unit 222 integrates real-time feedback from users to refine customization parameters and optimize interactions. This involves analyzing user responses and engagement levels to assess the effectiveness of customization settings and continuously updating customization parameters based on user feedback to enhance the conversational experience over time. The unit 222 enhance empathy and rapport in interactions, the customization unit 222 incorporates emotional intelligence by evaluating emotional cues from user inputs and adjusting responses to empathize with the user's emotional state, by crafting responses that demonstrate understanding and empathy towards the user's feelings and concerns. The customization unit 222 supports multilingual and cross-cultural interactions by generating content in multiple languages based on user preferences, incorporating cultural nuances and preferences into conversations to ensure relevance and appropriateness, by empowering users to customize their conversational experiences fosters a sense of ownership and satisfaction.

The training unit 224 is a pivotal component of the system that ensures continuous learning and improvement of the virtual voice assistant's conversational capabilities. The training unit 224 is responsible for training the underlying machine learning models, including the conversation simulator and predictive analytics models, using diverse datasets collected from user interactions, feedback, and historical data. Leveraging techniques such as supervised learning, reinforcement learning, and federated learning, the training unit 224 refines the system's ability to generate adaptive and contextually relevant conversational content. Federated learning ensures that model training occurs across multiple devices and data sources while maintaining user privacy by avoiding centralized storage of sensitive data. The training unit 224 also integrates insights from the feedback analysis unit 218 to fine-tune conversational strategies, improve response accuracy, and enhance user engagement. Furthermore, feedback analysis unit 218 enables the system to learn from multilingual and multimodal interactions, ensuring its capability to operate effectively in diverse linguistic and cultural contexts. Feedback analysis unit 218 ensures the system's adaptability, responsiveness, and ability to provide an increasingly natural and personalized interaction experience, by employing these advanced training methodologies.

Training unit 224 is a foundational component within the system for the adaptive generation of conversational content. The unit 224 encompasses the processes of model training, reinforcement learning, and continuous improvement to enhance the capabilities of the conversation simulator and ensure high-quality conversational experiences. The training unit 224 is responsible for training the conversation simulator model using diverse datasets and techniques. This includes aggregating and preprocessing data from various sources, such as user profiles, historical interactions, and contextual information. The unit 224 chooses appropriate machine learning algorithms and architectures, such as neural networks, for training the conversation simulator model. The training unit employs reinforcement learning techniques, to optimize conversational strategies and responses. The unit 224 involves defining a reward system based on user engagement levels, satisfaction scores, and other performance metrics to guide learning. The training unit 224 facilitates continuous improvement of the conversation simulator through iterative learning processes. This includes incorporating user feedback and real-time data into the training process to iteratively refine the conversation simulator's performance, periodically evaluating the performance of the conversation simulator model using validation datasets and performance metrics, adjusting learning rates and update frequencies based on the rate of model convergence and performance improvements.

The payment unit 226 facilitates transactions within the system for the adaptive generation of conversational content, ensuring fair compensation for conversational content generation and customization services provided to the one or more query users. The payment unit 226 processes transactions related to the generation and customization of conversational content. This includes receiving payments from the one or more query users for services rendered, such as conversational content generation, customization, and dynamic adaptation during interactions, ensuring that payment processing adheres to industry-standard security protocols to protect sensitive financial information. The payment unit 226 determines the pricing model for different services offered within the system. This involves calculating the cost of content generation, customization, and other value-added services based on factors such as complexity, duration, and user preferences. The payment unit 226 provides the one or more query users with clear and transparent pricing information to facilitate informed decision-making, for subscription-based services. Further, the payment unit manages user subscriptions and recurring payments. This includes offering different subscription tiers with varying levels of access and features and handling recurring billing cycles and subscription renewals automatically to ensure uninterrupted service access for users. The payment unit 226 may offer incentives to encourage user engagement and retention. This involves implementing loyalty programs or reward systems where users earn incentives or discounts based on their usage or engagement levels, providing bonuses or discounts to users who refer new customers to the platform, thereby fostering user growth and community engagement, for platforms involving multiple stakeholders, such as content creators and platform operators, the payment unit manages revenue distribution. This includes distributing earnings to content creators based on usage metrics, revenue sharing agreements, or other contractual arrangements, deducting platform fees or commissions from transactions to cover operational costs and sustain the platform's viability. The unit 226 ensures the security of financial transactions and user data by implementing robust privacy and security measures. This includes encrypting payment information and communication channels to protect sensitive financial data from unauthorized access, adhering to relevant financial regulations and compliance standards to safeguard user privacy and prevent fraud.

The multi-modal interaction unit 228 facilitates seamless communication between users and the conversational system through various modalities such as text, voice, and visual inputs. The unit 228 ensures that users can engage with the system using their preferred mode of communication, thereby enhancing accessibility and user experience. The multi-modal interaction unit 228 supports allowing users to specify their preferred input and output modalities, such as text-only, voice-only video only or a combination of both. The unit 228 incorporates accessibility features to accommodate users with diverse needs and preferences. This includes supporting assistive technologies such as screen readers and voice commands to enable access for users with disabilities. The unit 228 designs intuitive and user-friendly interfaces that facilitate easy interaction across modalities for all users. This involves optimizing algorithms and infrastructure to handle concurrent processing of text, voice, and visual inputs efficiently.

The emotional intelligence unit 230 is a vital component of the system, designed to enhance the virtual voice assistant's ability to engage empathetically and meaningfully with users. This emotional intelligence unit 230 processes emotional cues derived from user inputs, including voice tone, facial expressions, and biometric signals such as heart rate and galvanic skin response, to assess the emotional state of the user in real time. Leveraging advanced natural language processing (NLP) and sentiment analysis, the emotional intelligence unit 230 evaluates the context and sentiment behind user queries to generate responses that are emotionally attuned and supportive. Emotional intelligence unit 230 works in conjunction with the feedback analysis unit 216 and real-time conversation simulator to adapt the tone, pacing, and depth of interactions, ensuring that the conversation aligns with the user's emotional and psychological needs. The emotional intelligence unit 230 fosters trust and rapport, making interactions with the virtual voice assistant more engaging and human-like, by incorporating elements of empathy and emotional awareness. The emotional intelligence unit 230 ability to address complex emotional states, such as stress or frustration, and respond with appropriate support makes it an indispensable component for creating a positive and enriching user experience.

The multilingual support unit 232 is an essential feature of the system, enabling the virtual voice assistant to engage with users across diverse linguistic and cultural backgrounds. The multilingual support unit 232 leverages advanced natural language processing (NLP) models to support real-time translation, natural language understanding (NLU), and generation in multiple languages. The multilingual support unit 232 ensures that interactions are conducted in the language most comfortable for the user, by analysing the user's language preferences, as captured in their personalized profile. By analysing the user's language preferences, as captured in their personalized profile. The multilingual support unit 232 also facilitates seamless cross-linguistic communication by dynamically switching between languages during conversations, accommodating bilingual or multilingual users. Furthermore, the multilingual support unit 232 is equipped to interpret cultural nuances and idiomatic expressions, ensuring that the generated content is contextually appropriate and culturally sensitive. This capability makes the system highly adaptable for global audiences, enhancing its accessibility and usability. Integrated with other components, such as the Real-Time Conversation Simulator and Emotional Intelligence Unit, the multilingual support unit 232 ensures that the virtual voice assistant provides empathetic and engaging interactions, regardless of language barriers.

In an exemplary operation, the system is configured to adaptively generate conversational content with a virtual voice assistant. The system comprises a cloud server configured to host an adaptive conversational content generation service. In an embodiment, an electronic device configured to implement the virtual voice assistant. In an embodiment, the electronic device comprises: a processor; and a memory, communicatively coupled with the processor. In an embodiment, the memory stores processor-executable instructions, which on execution cause the processor to receive a voice input from a first user via a voice interface. In an embodiment, the voice input comprises a query and a wake word associated with the electronic device. In an embodiment, the first user is a deceased user, and the one or more query users are living user. In an embodiment, the interaction between the one or more query users and the trained conversation simulator corresponds to at least one of emotional support, education, or entertainment. In an embodiment, the interaction is driven using a multi-modal interaction including text, voice, and visual inputs, enabling the one or more query users to engage with simulated conversations through their preferred mode of communication.

In an embodiment, the virtual voice assistant being integrated within a mobile device, the electronic device, laptop, smart speakers, smartphones, smart appliances, wearable devices and other devices capable of voice interaction via the virtual voice assistant. In an embodiment, the Data collection unit 210 is configured for receiving an input from the one or more query users via the virtual voice assistant.

In an embodiment, the input is indicative of customizing one or more parameters of the conversations being provided by the virtual voice assistant. In an embodiment, the one or more parameters comprise a tone, a pacing, or a depth of interaction. In an embodiment, the input corresponds to individual preferences and emotional needs of the one or more query users.

In an embodiment, the Emotional intelligence unit 230 is configured for analyzing the input from the one or more query users for emotional cues and generating one or more relevant responses in the conversational content to enhance empathy and rapport in the interaction. In an embodiment, the Emotional intelligence unit 230 is configured for evaluating the sentiment of the one or more query users input in real-time and adjusting the tone and style of the conversational content to maintain a positive and supportive interaction. In an embodiment, the Emotional intelligence unit 230 is configured for employing natural language understanding (NLU) and natural language generation (NLG) techniques to analyze and generate the conversational content in multiple languages to enable cross-linguistic and cross-cultural interactions between the one or more query users and the virtual voice assistant.

In an embodiment, a request for access to the adaptive conversational content generation service is transmitted to the cloud server in response to the query. In an embodiment, the Payment unit 226 may be configured to receive a payment from the one or more query users via the virtual voice assistant. In an embodiment, the payment being received for at least one generation of the conversational content. In an embodiment, data associated with the first user is received from a plurality of sources and is further provided to the cloud server. In an embodiment, the data is provided by an input user. In an embodiment, the input user is a living person associated with the first user or the first user themselves.

In an embodiment, the data comprises image data, voice data, video data, social media posts, language preferences of the first user, demographic data. In an embodiment, the plurality of sources comprises interviews, online social media, news sources, information from acquaintances associated with the user, personal diaries, emails. In an embodiment, the data is uploaded to the cloud server by the first user through one or more voice input. In an embodiment, Profile creation unit 212 may be configured for creating a personalized profile associated with the first user based on the received data; Profile creation unit 212 may be configured for training the conversation simulator of the virtual voice assistant based on the received data and personalized profile associated with the first user. In an embodiment, the conversation simulator employs a reinforcement learning model that continuously improves its conversational strategies by receiving rewards based on the one or more query users'engagement levels and satisfaction scores. In an embodiment, the cloud server uses federated learning techniques to train the conversation simulator across multiple devices and data sources without compromising privacy of the one or more query users. In an embodiment, the personalized profile includes psychological and behavioral analysis of the first user for allowing the conversation simulator to tailor content based on personality traits, cognitive styles, and individual psychological needs. The real time conversation stimulator configured to generate conversational content in real-time to enable interaction between one or more query users and the virtual voice assistant accessing a trained conversation simulator based on the personalized profile associated with the first user. In an embodiment, the trained conversation simulator utilizes the adaptive conversational content generation service hosted on the cloud server.

In an embodiment, the real time conversation stimulator configured to generate the conversational content in real-time based on live events, news updates, or user context. In an embodiment, the conversational content is relevant and engaging in dynamic environments. In an embodiment, the real time conversation stimulator configured to provide the conversational content to the one or more query users during an interaction with the virtual voice assistant. In an embodiment, during the interaction, the one or more query users provide one or more input queries, and the trained conversation simulator generates the conversational content in real-time in response to the one or more input queries provided by the one or more query users. In an embodiment, the real time conversation stimulator configured to create a virtual representation of the first user based on the received data. In an embodiment, the virtual representation of the first user is displayed to the one or more query users during the interaction and In an embodiment, the real time conversation stimulator configured to integrate augmented reality (AR) or virtual reality (VR) environments. In an embodiment, the conversational content is presented in a 3D immersive experience, thereby enhancing the interaction by providing contextual visual and auditory stimuli aligned with the generated content. In an embodiment, the real time conversation stimulator configured to dynamically adapt the conversational content based on real-time feedback from the one or more query users and one or more interaction patterns within the interaction. In an embodiment, the dynamically adapted conversational content is personalized by the virtual voice assistant and provides an engaging interaction experience and provides the dynamically adapted conversational content to the one or more query users during the interaction via the virtual voice assistant.

In an embodiment, feedback analysis unit configured to analyze the real-time feedback to identify user preferences associated with the one or more query users and engagement levels of the one or more query users. In an embodiment, the real-time feedback comprises biometric data, from the one or more query users, comprising heart rate, galvanic skin response, stress levels, or facial expression analysis, to further personalize and adapt the conversational content based on the one or more query users'physiological and emotional state. In an embodiment, feedback analysis unit configured to anticipate one or more future interests and preferences of the one or more query users based on historical data and contextual cues using a predictive neural network model. In an embodiment, the predictive neural network model is configured for proactive conversation generation that aligns with the one or more query users evolving needs. In an embodiment, the predictive neural network model is configured to identify patterns and trends indicative of interests and preferences of the one or more query users over time, and proactively generating conversational content aligned with the one or more future interests and preferences of the one or more query users, thereby adapting to the one or more query users evolving needs. In an embodiment, revenue from the adaptive conversational content generation service is shared between a provider of proprietary processing software and a provider of the electronic device.

In an embodiment, the electronic device comprises local processing capabilities to execute machine learning techniques for generating responsive outputs without requiring cloud-based processing. In an embodiment, the electronic device comprising offering subscription tiers to users based on access level and processing features. In an embodiment, distributing subscription revenue between the software provider and the device provider and offering additional features such as premium data analysis or enhanced personalization for an additional fee. In an embodiment, the system is configured to provide AI-driven communication with living and deceased individuals integrated with existing voice recognition devices.

In an embodiment, the virtual voice assistant employs multimodal interaction, enabling the voice recognition electronic device to provide the conversational content through voice, text, and visual displays. In an embodiment, the voice recognition electronic device utilizes native machine learning techniques to perform partial processing of the data, with additional processing performed by the cloud server for enhanced personalization and accuracy. In an embodiment, the electronic device supports offline voice recognition and conversational functionality by storing a condensed version of the adaptive conversational content generation service locally. In an embodiment, the electronic device is configured to switch between local and cloud-based processing dynamically based on network availability, computational requirements, and user preferences, ensuring uninterrupted interaction with the virtual voice assistant.

In an embodiment, the virtual voice assistant employs a generative adversarial network (GAN) to simulate nuanced conversational styles, emotional expressions, and speech patterns that mimic the first user for a more natural interaction experience. In an embodiment, the system includes an AI-powered conflict resolution module to mediate disagreements or emotional conflicts between the query user and the virtual representation of the first user by analyzing sentiment and suggesting reconciliatory conversational paths. In an embodiment, the adaptive conversational content generation service incorporates advanced natural language processing (NLP) models capable of detecting and responding to implicit queries, sarcasm, or complex emotional states expressed by the query user.

In another exemplary operation, the application server 104 by receiving data associated with a first user from a plurality of sources creates a personalized profile associated with the first user based on the received data. In this embodiment the first user is a deceased user. In another embodiment, the data is provided by an input user, and the input user is a living person associated with the first user. For example, the input user may be a living family member of the first/deceased user. In an embodiment, the data comprises image data, voice data, video data, social media posts, language preferences of the first user, and demographic data. In an embodiment, the plurality of sources comprises interviews, online social media, news sources, information from acquaintances associated with the user, personal diaries, and emails. For example, if Alex is a deceased user, then the son (John) of the Alex may provide data such as image data, voice data, video data, social media posts, emails, and the like of Alex to create a customized profile of Alex.

The application server 104 is configured to generate conversational content in real-time on behalf of the first user to enable interaction between one or more query users and a trained conversation simulator based on the personalized profile associated with each of the first user and the one or more query users. In an embodiment, the input user may also be a query user. The interaction between the one or more query users and the trained conversation simulator corresponds to at least one of emotional support, education, or entertainment. In an embodiment, the interaction is driven using a multi-modal interaction including text, voice, and visual inputs, enabling the one or more query users to engage with simulated conversations through their preferred mode of communication. The application server 104 is configured to generate the conversational content in real-time based on live events, news updates, or user context. In an embodiment, the conversational content is relevant and engaging in dynamic environments. In an embodiment, the first user is a deceased user, and the one or more query users are living.

The application server 104 is configured to provide the conversational content to the one or more query users during an interaction. In an embodiment, during the interaction, the one or more query users provides one or more input queries. In an embodiment, the input user may also be a query user. In response to interactions, the conversational unit is capable of generating rich multimedia responses, such as video clips, still images, or audio recordings, in addition to textual responses. This multi-modal capability enhances the depth of the interaction by offering a more immersive and dynamic experience for the query users. For instance, if a query user requests memories or past experiences associated with the first user, the trained conversation simulator can produce relevant images or videos from the first user's archives, providing a visually engaging narrative. Similarly, audio recordings, such as voice messages or music that the first user enjoyed, can be incorporated into the conversation to evoke emotional connections and create a lifelike interaction.

The ability to integrate video, images, and audio as part of the conversational responses allows the trained conversation simulator to simulate a more natural and engaging dialogue. These media forms are generated or retrieved from pre-existing data associated with the first user, ensuring that they are personalized and contextually appropriate. The multimedia integration also enables the conversational system to better convey complex information, emotions, and nuances that may not be fully captured by text alone, thus offering query users a richer, more emotionally resonant experience during their interactions.

The application server 104 dynamically adapts the conversational content based on real-time feedback from the one or more query users and one or more interaction patterns within the interaction. In an embodiment, the dynamically adapted conversational content is personalized and provides an engaging interaction experience to the one or more query users during the interaction.

The application server 104 is configured to analyse the real-time feedback to identify user preferences associated with the one or more query users and engagement levels of the one or more query users. In an embodiment, the real-time feedback comprises biometric data, from the second user, heart rate, galvanic skin response, or facial expression analysis, to further personalize and adapt the conversational content based on the one or more query users physiological and emotional state.

The application server 104 is configured to anticipate one or more future interests and preferences of the one or more query users based on historical data and contextual cues using a predictive neural network artificial intelligence model. In an embodiment, the predictive neural network artificial intelligence model is configured for proactive conversation generation that aligns with the one or more query users evolving needs. In an embodiment, the predictive neural network artificial intelligence model is configured to identify patterns and trends indicative of the interests and preferences of the one or more query users over time and proactively generate conversational content aligned with one or more future interests and preferences of the second user, thereby adapting to the one or more query users evolving needs.

The application server 104 is configured to receive an input from the one or more query users, and the input is indicative of customizing one or more parameters of the conversations. In an embodiment, the one or more parameters comprises a tone, a pacing, or a depth of interaction. In an embodiment, the input corresponds to the individual preferences and emotional needs of the one or more query users. The application server 104 is configured to analyse the input from the one or more query users for emotional cues and generate one or more relevant responses in the conversational content to enhance empathy and rapport in the interaction. By evaluating the sentiment of the one or more query users input in real time and adjusting the tone and style of the conversational content the application server 104 is configured to maintain positive and supportive interaction. The application server 104 is configured to employ natural language understanding (NLU) and natural language generation (NLG) techniques to analyse and generate the conversational content in multiple languages to enable cross-linguistic and cross-cultural interactions between the one or more query users and the trained conversation simulator.

The application server 104 is configured to train the conversation simulator based on the received data and personalized profile associated with the first user. In an embodiment, the conversation simulator employs a reinforcement learning model that continuously improves its conversational strategies by receiving rewards based on the one or more query users'engagement levels and satisfaction scores. In an embodiment, the application server 104 uses federated learning techniques to train the conversation simulator across multiple devices and data sources without compromising the privacy of the one or more query users. In an embodiment, the personalized profile includes psychological and behavioural analysis of the one or more query users to allow the conversation simulator to tailor content based on personality traits, cognitive styles, and individual psychological needs.

In an embodiment, the application server 104 is configured to create a virtual representation of the first user based on the received data. The virtual representation of the first user is displayed to the one or more query users during the interaction. In an embodiment, the application server 104 is configured to integrate augmented reality (AR) or virtual reality (VR) environments to provide the conversational content to the one or more query users. In an embodiment, the conversational content is presented in a 3D immersive experience, thereby enhancing the interaction by providing contextual visual and auditory stimuli aligned with the generated content. In an embodiment, the one or more query users may utilize a virtual head set to experience the VR. The application server 104 is configured to receive a payment from the one or more query users. In an embodiment, the payment is received for at least one generation or dynamic adaptation of the conversational content during the interaction.

Figure 3:
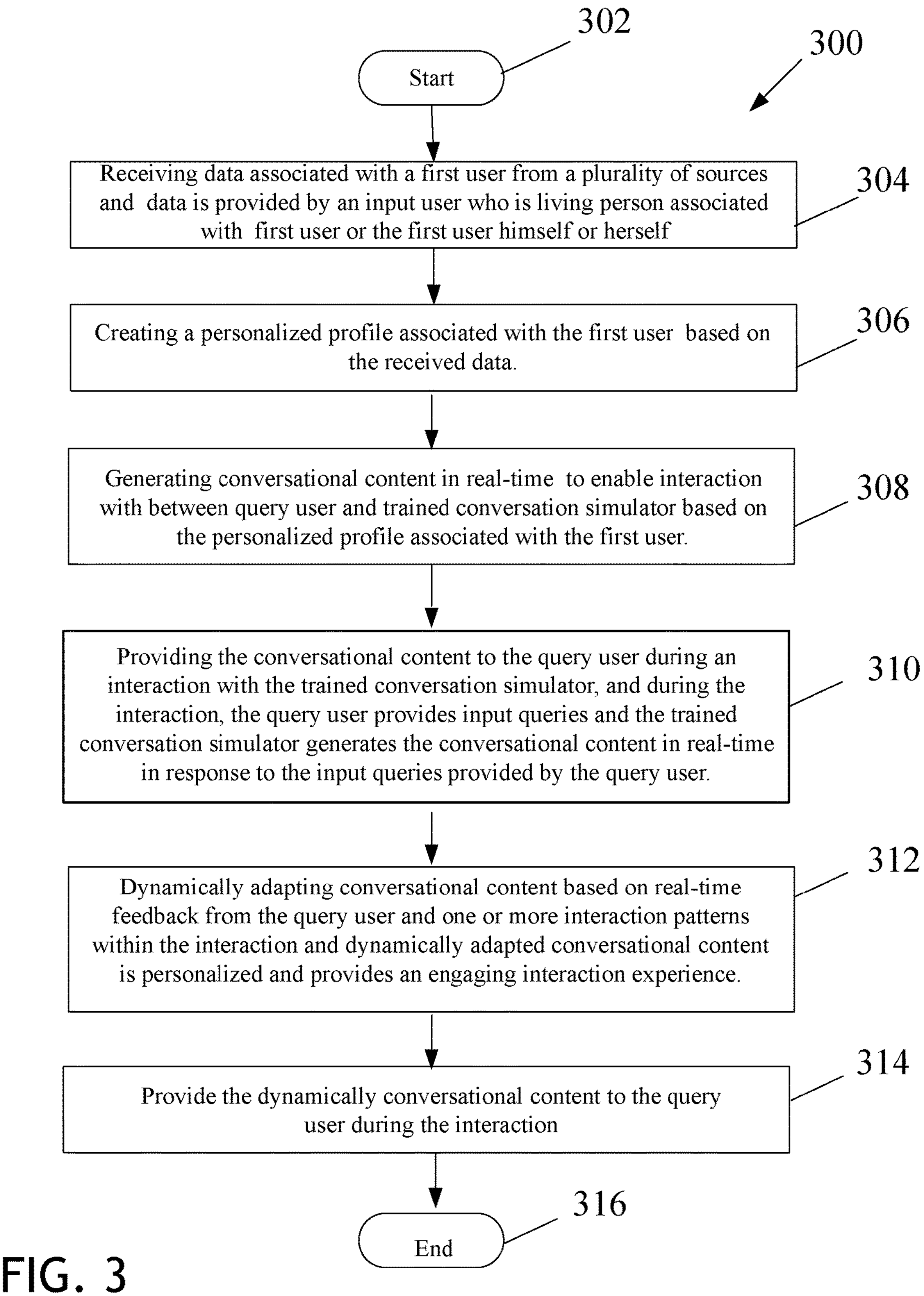
FIG. 3 is a flowchart that illustrates a method for adaptive generation of conversational content using a virtual voice assistant, in accordance with an embodiment of present invention.

FIG. 3 is a flowchart that illustrates system and a method to adaptively generate conversational content with a virtual voice assistant, in accordance with an embodiment of present invention. The method begins in a start step 302 and proceeds to step 304. At step 304, cloud server 104 receives a voice input from a first user via a voice interface. The voice input comprises a query and a wake word associated with the electronic device. At step 306, cloud server 104 transmits a request for access to the adaptive conversational content generation service hosted on the cloud server in response to the query. At step 308, cloud server 104 receives data associated with the first user from a plurality of sources and providing the data to the cloud server. The data is provided by an input user. The input user is a living person associated with the first user or the first user themselves. At step 310, a cloud server 104 Create a personalized profile associated with the first user based on the received data. At step 312 a cloud server 104 generates conversational content in real-time to enable interaction between one or more query users and the virtual voice assistant accessing a trained conversation simulator based on the personalized profile associated with the first user, the trained conversation simulator utilizes the adaptive conversational content generation service hosted on the cloud server. At step 314 cloud server 104 provides the conversational content to the one or more query users during an interaction with the virtual voice assistant during the interaction, the one or more query users provide one or more input queries, and the trained conversation simulator generates the conversational content in real-time in response to the one or more input queries provided by the one or more query users. At step 316 a cloud server dynamically adapts the conversational content based on real-time feedback from the one or more query users and one or more interaction patterns within the interaction, the dynamically adapted conversational content is personalized by the virtual voice assistant and provides an engaging interaction experience. At step 318 a cloud server provides dynamically adapted conversational content to the one or more query users during the interaction via the virtual voice assistant. At step Control passes end step 320.

Figure 4:
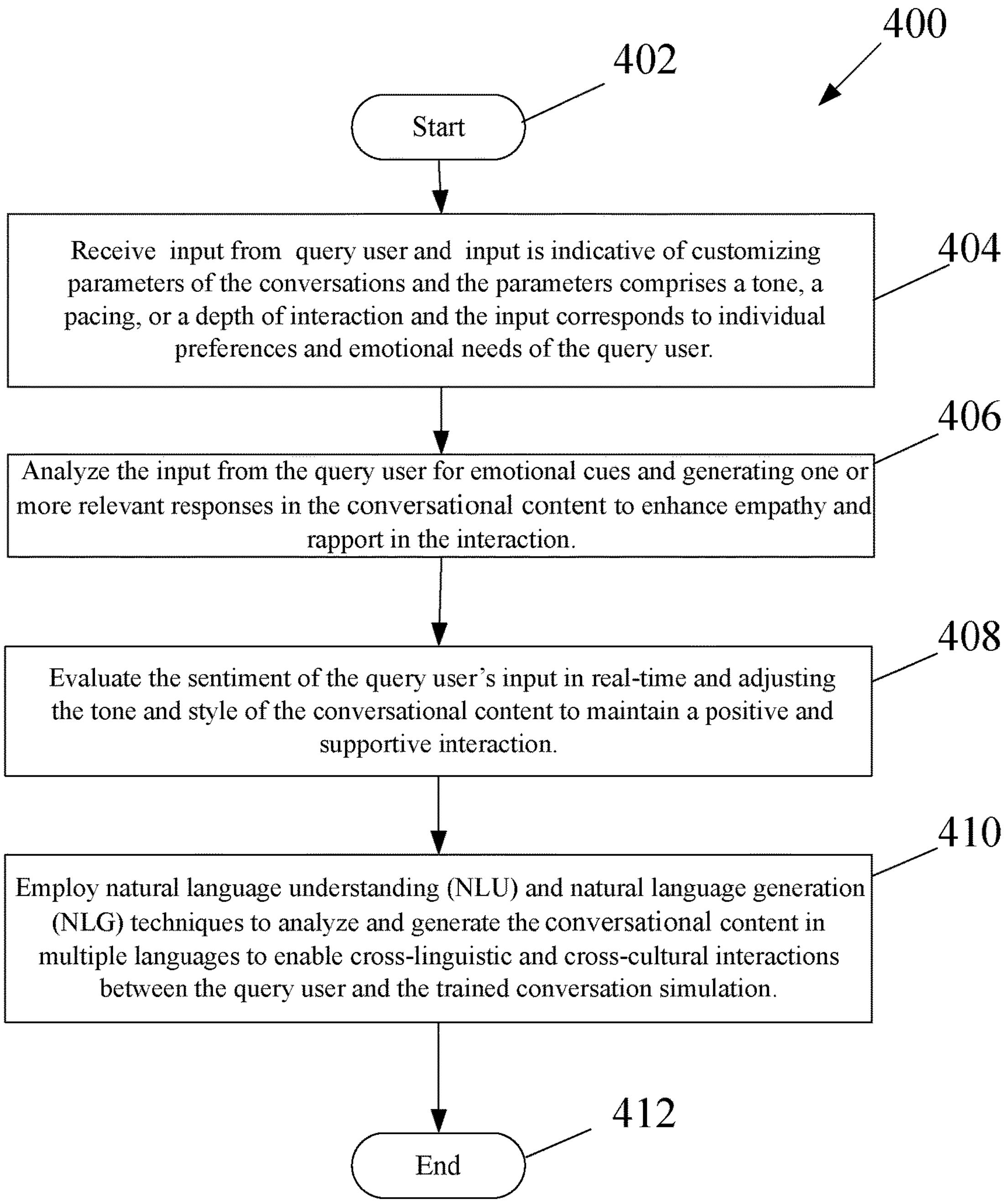
FIG. 4 is a flowchart that illustrates a method for adaptive generation of conversational content, in accordance with an embodiment of present invention.

FIG. 4 is a flowchart that illustrates a method 400 for adaptive generation of conversational content, in accordance with an embodiment of present invention. The method begins in a start step 402 and proceeds to step 404. At step 404, an application server is configured to receive an input from the one or more query users. The input is indicative of customizing one or more parameters of the conversations. The one or more parameters comprises a tone, a pacing, or a depth of interaction. The input corresponds to individual preferences and emotional needs of the one or more query users. At step 406, an application server is configured to analyse the input from the one or more query users for emotional cues and generate one or more relevant responses in the conversational content to enhance empathy and rapport in the interaction. At step 408, an application server is configured to evaluate the sentiment of the one or more query users input in real-time and adjusts the tone and style of the conversational content to maintain a positive and supportive interaction. At step 410, an application server is configured to employ natural language understanding (NLU) and natural language generation (NLG) techniques to analyze and generate the conversational content in multiple languages to enable cross-linguistic and cross-cultural interactions between the one or more query users and the trained conversation simulator. Control passes to end step 412.

In a working but non-limiting example of the aforementioned disclosure, present disclosure involves a user interacting with a virtual voice assistant integrated into a smartphone. The user, let's call them User A, begins by activating the assistant with a wake word and asks a question about upcoming local events. The voice input, along with other data such as User A's preferences, historical interactions, and biometric data from wearable devices (e.g., heart rate or stress levels), is sent to the cloud server. The server processes the data and creates a personalized profile for User A, which includes their past interactions, interests, and emotional states. The conversation simulator unit generates conversational content in real-time, answering User A's query about events while tailoring the response to match their tone preferences and current emotional state, using this profile. If User A appears stressed based on their biometric data, the assistant's tone may be adjusted to sound more soothing, offering a more empathetic interaction. As the conversation continues, the feedback analysis unit detects User A's engagement level through subtle cues in their responses and adjusts the dialogue accordingly.

If User A asks a follow-up question about a specific event, the system uses predictive modelling to anticipate related interests, such as User A's favourite music or activities, integrating this into the conversation proactively. The assistant is able to continue this interaction seamlessly even if User A moves to an area with no internet connection, relying on offline processing capabilities. In addition, if User A decides to interact in a different language or wishes for more detailed information, the multilingual support unit ensures that the assistant can respond in the requested language, offering a culturally sensitive and linguistically accurate response. This working example highlights how the system uses real-time data, advanced machine learning techniques, and contextual awareness to provide an engaging, personalized, and adaptive conversational experience.

In a working but non-limiting example of the aforementioned disclosure, the present disclosure can be illustrated through its application in a smart speaker system equipped with the described conversational capabilities. Upon initial setup, the user interacts with the smart speaker by providing voice samples and optionally uploading personal data, such as emails, text messages, and multimedia files, through a secure user interface. This data is transmitted to a cloud-based processing server, where proprietary machine learning algorithms analyze the user-specific data to identify communication patterns, voice tone, and preferences. When the user issues a voice command or query, such as "What should I wear today?" or "Can you remind me of my plans this weekend?" the smart speaker processes the input locally or transmits it to the cloud server for more complex analysis. The system retrieves relevant contextual information from the user's stored data, such as weather updates, calendar events, or prior preferences, and generates a response that aligns with the user's style of communication. For instance, it may respond with, "It looks like it's going to be sunny all day, how about your favorite blue jacket?" or "Your weekend plans include lunch with Sarah on Saturday at 1 PM." As the user continues interacting with the device, the system continuously updates its model by integrating new voice inputs, messages, and multimedia, refining its ability to provide accurate and personalized responses. The user also has the option to subscribe to a premium service tier, unlocking features such as advanced analytics on personal data or deeper personalization options, like voice synthesis that closely mimics the user's tone for reminders or notifications. The flexibility of the system to perform computations locally when offline ensures seamless operation regardless of connectivity, demonstrating its robustness and practicality in everyday use.

The system employs a continual learning framework to adaptively refine its underlying machine learning models based on user interactions over time. Each time the user engages with the smart speaker whether by issuing a voice command, responding to prompts, or uploading new personal data such as emails, calendar updates, photos, or text messages the system extracts contextual and semantic features from the new inputs. These features are then used to incrementally update the user profile and retrain portions of the personalized language and behavior prediction models. The system may use techniques such as online learning, federated learning, or differential model fine-tuning to update specific model parameters without requiring full retraining, thereby maintaining high performance while preserving responsiveness and data efficiency. Updates may be performed locally for routine adjustments or queued for asynchronous processing on the cloud server for more computationally intensive refinements. The updated models are version-controlled and periodically validated to ensure they maintain alignment with the user's evolving communication patterns, emotional tone, and content preferences. This adaptive feedback mechanism enables the system to become progressively more personalized and context-aware, delivering increasingly relevant, human-like interactions with minimal manual configuration.

The conversation simulator unit processes the input data and generates a response, drawing on the user's profile. Based on the real-time data, the assistant decides to soften its tone to be more soothing, adjusting the speaking rate to 125 words per minute (slightly slower than the average conversational rate) to reduce potential stress in User A. The assistant responds, "The weather in New York today is partly cloudy with a high of 72° F. and a low of 60° F. I can recommend a nice place to relax if you'd like." As the conversation continues, User A, now feeling more engaged, asks, "Can you suggest a quiet park to visit?" The predictive modelling unit anticipates that User A enjoys nature-based activities (a pattern identified in their profile from past interactions) and responds with, "I know a peaceful spot, Central Park's Conservatory Garden is beautiful and quiet. Would you like directions?" The system also analyzes User A's physiological data for stress levels. Given the detected stress from their heart rate, the assistant slightly adjusts its voice again to a more empathetic tone, slowing down the pacing to help relax the user. Simultaneously, the multilingual support unit detects User A's secondary language preference, French, and offers to provide the information in French. The assistant's next response in French is, "Le temps à New York aujourd'hui est partiellement nuageux avec une température maximale de 22° C. et minimale de 16° C. Voulez-vous que je vous recommande un endroit calme à visiter?".

Despite being in an area with a weak internet connection, the assistant seamlessly switches to offline processing. The assistant uses local machine learning models to continue the interaction, processing User A's queries and adjusting the conversation as needed. When User A asks for a reminder to visit the park later, the offline unit stores the request and sends a notification to the device once internet connectivity is restored. Throughout the interaction, the system uses real-time biometric feedback, predictive modelling, and multilingual support to adapt its responses based on User A's preferences, emotional state, and contextual needs, resulting in a personalized and emotionally intelligent conversation. The system processes approximately 15 different parameters, including heart rate, location, past interactions, and tone preferences, ensuring a dynamic and customized experience.

In a working but non-limiting example of the aforementioned disclosure, let us consider a Scenario for Virtual Grief Counseling. A company provides virtual grief counselling services using the present disclosure. The system is designed to simulate conversations with deceased loved ones, providing emotional support and helping users process their grief through personalized and adaptive interactions. The system collects the following data on social media posts of the deceased user (John Doe), 200 Facebook posts, 500 Twitter tweets, 2,000 emails, 50 pages of diary entries, 20 hours of voice messages, and 500 images. In an embodiment, the data on social media posts of the deceased user (John Doe), 200 Facebook posts, 500 Twitter tweets, 2,000 emails, 50 pages of diary entries, 20 hours of voice messages, and 500 images may be provided by an input user such as a family member of John Doe. In an embodiment, the input user may also be a query user.

Now Biometric Data of one or more query users, Jane Smith is collected and monitored. For example, the Heart rate is monitored using a wearable device (e.g., average 70 BPM, spikes to 90 BPM during emotional responses). Further, galvanic skin response is measured to detect stress levels and facial expressions are captured using a webcam for sentiment analysis.

John Doe's (Deceased user) Profile: Based on the collected data, a comprehensive profile is created, capturing personality traits (e.g., extroverted, humorous), favorite topics (e.g., sports, music), and writing style (e.g., informal, emotive). Further, Jane Smith's (one or more query users user) Profile includes her emotional triggers, preferred conversation topics (e.g., memories with John), and communication style.

Now, the conversation simulator is trained using data from John Doe's profile, ensuring it can mimic his conversational style accurately. The simulator generates a greeting: "Hi Jane, its John. I've been thinking about the time we went to that amazing concert. How have you been?" The system (trained conversation simulator) recognizes Jane's response and sentiment (e.g., "I miss you so much" with a sad tone). As Jane interacts, the simulator adapts responses based on her real-time feedback and emotional state. If Jane's heart rate increases, indicating stress, the system provides calming messages: "I know it's hard, Jane. Take a deep breath and remember the good times we had together." The system continuously monitors Jane's biometric data and facial expressions to adjust the conversation tone. Jane's facial expression shows a smile when recalling a happy memory, so the system follows up with another positive memory: "Remember that beach trip where we watched the sunset?" The predictive modelling unit uses historical data to predict future conversational topics predicts Jane might want to talk about John's advice on life decisions, and generates proactive content: "Jane, remember how we always talked about following your dreams? What's the latest on your new project?" Jane customizes the interaction parameters via an app and the Tone sets to "reassuring" and the Pacing adjusts to "slow" to allow time for reflection. Further the Depth of the conversation chooses "details" to delve deeply into memories. The system adjusts responses to be more detailed and reassuring: "Jane, you're doing an amazing job. Remember when we tackled tough times together? You have that strength in you."

Further, the conversation simulator employs reinforcement learning, improving based on Jane's engagement. The Engagement Score tracks engagement (e.g., high when Jane responds quickly and positively) and the Reward System adjusts conversation strategies to maximize engagement scores over time. In an embodiment, a Subscription Model may exist in the system and Jane subscribes to the service, by paying $19.99/month. The system processes payments securely and provides access to personalized conversation sessions. The system provides multi-modal interaction utilizing Text, Voice, and Visuals. For example, Jane can interact using text on her smartphone, voice via a smart speaker, and visuals through a VR headset. Jane uses VR to "see" a virtual representation of John in a favorite place they visited, enhancing the emotional connection.

Let us consider another detailed working example of the disclosure where the scenario is an Educational Interaction with Martin Luther King Jr. A company provides an educational service for school students, allowing them to engage in virtual conversations with a simulated version of Martin Luther King Jr. (MLK). The service uses the claimed invention to offer personalized, adaptive, and interactive learning experiences focusing on civil rights, history, and social justice. The Data collection unit collects data from various sources such as Historical speeches and writings (e.g., "I Have a Dream," "Letter from Birmingham Jail"), Biographies and historical records, Audio and video recordings of speeches, Social media content and public statements. The system collects data from the students (e.g., their interests, learning styles, and previous interactions), Learning preferences (e.g., visual, auditory), Performance data (e.g., grades in history and social studies), Engagement levels during past educational activities (e.g., participation in class discussions).

Based on the collected data, a comprehensive profile is created to capture his personality traits, rhetorical style, and key topics of interest. Detailed profiles are created for each student, including their educational background, learning preferences, and areas of interest. The conversation simulator is trained using MLK's historical data, ensuring it can accurately simulate his speech patterns and knowledge. The simulator initiates a conversation: "Hello, students. I am Dr. Martin Luther King Jr. Today, I'd like to talk to you about the importance of equality and justice. As students interact, the simulator adapts responses based on their real-time feedback and engagement levels. If students ask about the civil rights movement, the system provides detailed explanations and anecdotes from MLK's experiences. If a student shows interest in non-violent protest, the system elaborates on MLK's philosophy and methods. Feedback Analysis Unit continuously monitors student reactions using facial recognition and engagement metrics and detects when students are confused or disengaged and adjusts the complexity of the content accordingly.

Example: If a student's facial expression shows confusion during a discussion on the "Letter from Birmingham Jail," the system simplifies the explanation and provides additional context. Predictive Modeling Unit uses historical and contextual data to predict and introduce relevant topics. Predicts students might be interested in MLK's views on contemporary social justice issues and thus generates proactive content: "In today's world, the fight for justice continues in many forms. Let's discuss how we can apply the principles of non-violence to current events." In an embodiment, the teachers can customize interaction parameters via an app and the Tone is set to educational and inspiring; the Pacing is adjusted to "moderate" to allow for in-depth discussion, and Depth is chosen as "detailed" to delve deeply into historical events and MLK's philosophy.

The system adjusts responses to be more detailed and inspiring: "Remember, students, the power of love and non-violence can change the world. Let's explore how we can make a difference today." The conversation simulator employs reinforcement learning, improving based on student engagement. The system tracks engagement levels (e.g., high when students ask follow-up questions and participate actively). The reward system adjusts conversation strategies to maximize student engagement and learning outcomes over time.

The payment unit provides a subscription model for schools to subscribe to the service by paying an annual fee of $999. The system processes payments securely and provides access to the virtual MLK interactions for the academic year. Multi-Modal Interaction Unit enables students to interact using text on classroom tablets, voice via classroom smart speakers, and visuals through interactive whiteboards. Example Interaction: Students use an interactive whiteboard to view a virtual representation of MLK delivering his “I Have a Dream” speech, enhancing the learning experience with immersive visuals and audio.

Various embodiments of the disclosure lie in its ability to offer a highly adaptive, personalized, and contextually aware virtual voice assistant that enhances user interaction through advanced machine learning techniques and real-time responsiveness. One significant advantage is the system’s capacity to generate conversational content tailored to individual user profiles, utilizing data from multiple sources such as voice inputs, biometric data, and historical interactions, ensuring a deeply personalized experience. Additionally, the integration of real-time feedback analysis allows the assistant to dynamically adjust its responses based on the user’s emotional and physiological state, fostering more engaging and empathetic interactions. The predictive modeling capabilities further enhance the system’s ability to anticipate user needs and preferences, enabling proactive conversation generation aligned with the user’s evolving requirements.

The use of generative adversarial networks (GAN) provides a technical advantage by simulating nuanced human speech patterns and emotional expressions, making the interactions feel more natural and authentic. This results in more emotionally resonant and lifelike conversational experiences. Moreover, the system supports offline and dynamic processing, allowing it to function seamlessly even in low-connectivity environments, ensuring continuous user engagement. The multilingual support unit expands the system’s accessibility, enabling cross-linguistic and cross-cultural communication, making it adaptable for a global audience. Furthermore, the use of advanced natural language processing (NLP) and natural language generation (NLG) techniques ensures that the assistant can handle complex queries and respond in a linguistically and emotionally appropriate manner, increasing the system’s versatility and user satisfaction.

The present disclosure delivers a tangible and practical solution to specific technical challenges in voice recognition and conversational machine learning systems, including the absence of personalization, contextual understanding, and adaptability. Unlike generalized algorithms or theoretical ideas, this present disclosure establishes a detailed framework for integrating user-specific data such as voice recordings, multimedia content, and text-based interactions into machine learning models to produce customized and context-aware responses. The present disclosure incorporates well-defined technical implementations, such as the dual utilization of cloud-based and local processing, methods for continuous learning and real-time model updates, and the seamless integration of diverse data formats to enhance the accuracy and relevance of response generation. These features reflect concrete processes and systems designed for practical application.

The present disclosure represents a significant technical advancement that is not abstract and would not be readily developed by a skilled practitioner in the field. Combining complex and advanced technical elements, such as the synthesis of communication styles from multifaceted user data, requires deep expertise in machine learning, natural language processing, and data modelling. The system’s flexibility to operate on both cloud and local processing frameworks, coupled with its ability to adapt dynamically through ongoing learning, provides a robust and versatile solution to longstanding challenges in conversational machine learning. Additionally, the introduction of a subscription-based model, designed to make advanced features accessible at scale while offering tailored monetization strategies, showcases a forward-thinking approach not evident in existing systems. These unique integrations and methodologies set the present disclosure apart from prior technologies and demonstrate its innovative and practical value.

Various embodiments of the disclosure encompass numerous advantages including the system creates highly personalized profiles based on extensive data, including social media posts, biometric data, and personal communications. Present disclosure delivers conversational content tailored to individual preferences, emotional states, and contextual factors, resulting in more relevant and engaging interactions. One another advantage of the present disclosure is that system dynamically adapt conversational content based on real-time feedback and interaction patterns. Present disclosure ensures that interactions remain relevant and engaging throughout the conversation, enhancing user satisfaction and engagement. Present disclosure integrates text, voice, and visual inputs into a seamless and coherent interaction experience in this way present disclosure provides a versatile and accessible user experience, allowing users to interact using their preferred communication mode. Scalable data processing utilizes distributed computing and advanced machine learning algorithms to process large volumes of data efficiently. Present disclosure enables real-time content generation and adaptation without latency or performance degradation, supporting high-demand environments. Enhanced privacy and security employs federated learning and data anonymization techniques to protect user privacy. The disclosure allows models to be trained across multiple devices without centralizing sensitive data, reducing the risk of data breaches and unauthorized access. Emotionally engaging interactions integrate sophisticated sentiment analysis and natural language understanding (NLU) to generate empathetic responses. This creates emotionally resonant conversations that enhance user engagement and emotional connection.

Users can use predictive neural network models to anticipate future user needs and preferences. The present disclosure enables the proactive generation of relevant conversational content, aligning with users’evolving interests and preferences. Monetization capabilities in the present disclosure incorporate a payment system for generating and dynamically adapting conversational content. The present disclosure also provides a viable business model for offering personalized conversational services, supporting the sustainability and growth of the system. Yet another advantage of the present disclosure is that the user gets an immersive interaction experience. The present disclosure enhances user engagement by providing contextual visual and auditory stimuli, making interactions more compelling and immersive.

The present disclosure involves a concrete and specific implementation of various technological components that collectively form an advanced system for generating adaptive conversational content. The system uses tangible data sources, real-time processing, and integration of advanced machine learning models to achieve its objectives. These elements go beyond conventional means and embody practical applications in technology, such as data collection unit aggregates real data from multiple sources including biometric sensors, social media, and personal communications, which are tangible and measurable. Profile creation unit creates detailed user profiles using psychological and behavioral analysis, resulting in specific and actionable data points that inform the conversation simulator. Conversation simulator unit employs advanced NLU and NLG techniques, leveraging concrete algorithms and computational processes to generate conversational content in real-time. Real-Time interaction unit processes and responds to user inputs dynamically, requiring real-time computational operations and data handling. Predictive modeling unit utilizes predictive neural networks to analyze historical and contextual data, generating specific, anticipatory conversational content. These units and their interactions are implemented using specific techniques, data structures, and processing techniques that provide a technical solution to the problem of adaptive and contextual conversational content generation.

The present disclosure represents a unique combination and application of several advanced techniques and technologies. The specific integration and interplay of these elements demonstrate a level of innovation that goes beyond what is obvious to a person skilled in the art. The use of reinforcement learning and predictive neural networks for real-time adaptation and proactive content generation is an innovative application of these models in the context of conversational AI. Multi-modal interaction integrating text, voice, and visual inputs within a single coherent system, and further enhancing this with AR and VR environments, represents a significant technical advancement in user interaction design. Real-Time feedback and adaptation the dynamic adaptation of conversational content based on real-time biometric feedback and interaction patterns involves sophisticated real-time data processing and analysis that are not trivial or obvious. Federated learning for privacy implementing federated learning techniques to train models across multiple devices while ensuring privacy is a complex approach to enhancing data security and model training efficiency.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments falling within the scope of the appended claims.

What is claimed is:

1. A system to adaptively generate conversational content with a virtual voice assistant, the system comprising:

a cloud server configured to host an adaptive conversational content generation service;

an electronic device configured to implement the virtual voice assistant, wherein the electronic device comprises:

a processor; and a memory, communicatively coupled with the processor, wherein the memory stores processor-executable instructions, which on execution cause the processor to:

receive a voice input from a first user via a voice interface, wherein the voice input comprises a query and a wake word associated with the electronic device;

transmit a request for accessing the adaptive conversational content generation service hosted on the cloud server in response to the query;

receive data associated with the first user from a plurality of sources and providing the data to the cloud server, wherein the data is provided by an input user, wherein the input user is a living person associated with the first user or the first user themselves;

create a personalized profile associated with the first user based on the received data;

generate conversational content in real-time to enable interaction between at least one query users and the virtual voice assistant accessing a trained conversation simulator based on the personalized profile associated with the first user, wherein the trained conversation simulator utilizes the adaptive conversational content generation service hosted on the cloud server;

provide the conversational content to the at least one query users during an interaction with the virtual voice assistant, wherein during the interaction, the at least one query users provides at least one input queries, and the trained conversation simulator generates the conversational content in real-time in response to the at least one input queries provided by the at least one query users;

dynamically adapt the conversational content based on real-time feedback from the at least one query users and at least one interaction patterns within the interaction, wherein the dynamically adapted conversational content is personalized by the virtual voice assistant and provides an engaging interaction experience; and provide the dynamically adapted conversational content to the at least one query users during the interaction via the virtual voice assistant;

anticipate at least one future interests and preferences of the at least one query users based on historical data and contextual cues using a predictive neural network model, wherein the predictive neural network model is configured for proactive conversation generation that aligns with the at least one query users evolving needs, wherein the predictive neural network model is configured to identify patterns and trends indicative of interests and preferences of the at least one query users over time, wherein the predictive neural network model comprises one of recurrent neural network, long short-term memory, gated recurrent unit and a convolutional neural network; and proactively generate conversational content aligned with the at least one future interests and preferences of the at least one query users, thereby adapting to the at least one query user's evolving needs.

2. The system to adaptively generate conversational content with a virtual voice assistant as claimed in claim 1, analyzing the real-time feedback to identify user preferences associated with the at least one query users and engagement levels of the at least one query users, wherein the real-time feedback comprises biometric data, from the at least one query users, comprising heart rate, galvanic skin response, stress levels, or facial expression analysis, to further personalize and adapt the conversational content based on the at least one query users physiological and emotional state.

3. The system to adaptively generate conversational content with a virtual voice assistant as claimed in claim 1, comprising:

receiving an input from the at least one query users via the virtual voice assistant, wherein the input is indicative of customizing at least one parameters of the conversations being provided by the virtual voice assistant, wherein the at least one parameters comprises a tone, a pacing, or a depth of interaction, wherein the input corresponds to individual preferences and emotional needs of the at least one query users;

analyzing the input from the at least one query users for emotional cues and generating at least one relevant responses in the conversational content to enhance empathy and rapport in the interaction, evaluating the sentiment of the at least one query users input in real-time and adjusting the tone and style of the conversational content to maintain a positive and supportive interaction; and employing natural language understanding (NLU) and natural language generation (NLG) techniques to analyze and generate the conversational content in multiple languages to enable cross-linguistic and cross-cultural interactions between the at least one query users and the virtual voice assistant.

4. The system to adaptively generate conversational content with a virtual voice assistant as claimed in claim 1, comprising training the conversation simulator of the virtual voice assistant based on the received data and personalized profile associated with the first user, and wherein the conversation simulator employs a reinforcement learning model that continuously improves its conversational strategies by receiving rewards based on the at least one query users engagement levels and satisfaction scores, wherein the cloud server uses federated learning techniques to train the conversation simulator across multiple devices and data sources without compromising privacy of the at least one query users, and wherein the personalized profile includes psychological and behavioral analysis of the first user for allowing the conversation simulator to tailor content based on personality traits, cognitive styles, and individual psychological needs.

5. The system to adaptively generate conversational content with a virtual voice assistant as claimed in claim 1, comprising receiving payment from the at least one query users via the virtual voice assistant, wherein the payment being received for generation of the conversational content.

6. The system to adaptively generate conversational content with a virtual voice assistant as claimed in claim 1, wherein the data comprises image data, voice data, video data, social media posts, language preferences of the first user, and demographic data, and wherein the plurality of sources comprises interviews, online social media, news sources, information from acquaintances associated with the user, personal diaries, emails, and wherein the data is uploaded to the cloud server by the first user through at least one of voice input, text files, image files, video files, pdf files.

7. The system to adaptively generate conversational content with a virtual voice assistant as claimed in claim 1, wherein the first user is a deceased user and the at least one query users are living user, wherein the interaction between the at least one query users and the trained conversation simulator corresponds to at least one of emotional support, education, and entertainment, and wherein the interaction is driven using a multi-modal interaction including text, voice, and visual inputs, enabling the at least one query users to engage with simulated conversations through their preferred mode of communication.

8. The system to adaptively generate conversational content with a virtual voice assistant as claimed in claim 1, comprising:

creating a virtual representation of the first user based on the received data, wherein the virtual representation of the first user is displayed to the at least one query users during the interaction; and integrating augmented reality (AR) or virtual reality (VR) environments, wherein the conversational content is presented in a 3D immersive experience, thereby enhancing the interaction by providing contextual visual and auditory stimuli aligned with the generated content.

9. The system as claimed in claim 1, wherein the virtual voice assistant being integrated within a mobile device, the electronic device, laptop, smart speakers, smartphones, smart appliances, and wearable devices capable of voice interaction via the virtual voice assistant.

10. The system to adaptively generate conversational content with a virtual voice assistant as claimed in claim 1, wherein revenue from the adaptive conversational content generation service is shared between a provider of proprietary processing software and a provider of the electronic device.

11. The system to adaptively generate conversational content with a virtual voice assistant as claimed in claim 1, wherein the electronic device comprises local processing capabilities to execute machine learning techniques for generating responsive outputs without requiring cloud-based processing.

12. The system to adaptively generate conversational content with a virtual voice assistant as claimed in claim 1, comprising:

offering subscription tiers to users based on access level and processing features;

distributing subscription revenue between the software provider and the device provider; and offering additional features such as premium data analysis or enhanced personalization for an additional fee.

13. The system to adaptively generate conversational content with a virtual voice assistant as claimed in claim 1, wherein the system is configured to provide AI-driven communication with living and deceased individuals integrated with existing voice recognition devices.

14. The system to adaptively generate conversational content with a virtual voice assistant as claimed in claim 1, wherein the virtual voice assistant employs multimodal interaction, enabling the voice recognition electronic device to provide the conversational content through at least one of voice, text, and visual displays.

15. The system to adaptively generate conversational content with a virtual voice assistant as claimed in claim 1, wherein the voice recognition electronic device utilizes native machine learning techniques to perform partial processing of the data, with additional processing performed by the cloud server for enhanced personalization and accuracy, and wherein the electronic device supports offline voice recognition and conversational functionality by storing a condensed version of the adaptive conversational content generation service locally.

16. The system to adaptively generate conversational content with a virtual voice assistant as claimed in claim 1, wherein the electronic device is configured to switch between local and cloud-based processing dynamically based on network availability, computational requirements, and user preferences, ensuring uninterrupted interaction with the virtual voice assistant.

17. The system to adaptively generate conversational content with a virtual voice assistant as claimed in claim 1, wherein the virtual voice assistant employs a generative adversarial network (GAN) to simulate nuanced conversational styles, emotional expressions, and speech patterns that mimic the first user for a more natural interaction experience, and wherein the system includes an AI-powered conflict resolution module to mediate disagreements or emotional conflicts between the query user and the virtual representation of the first user by analyzing sentiment and suggesting reconciliatory conversational paths.

18. The system to adaptively generate conversational content with a virtual voice assistant as claimed in claim 1, wherein the adaptive conversational content generation service incorporates advanced natural language processing (NLP) models capable of detecting and responding to implicit queries, sarcasm, or complex emotional states expressed by the query user.

19. A smart speaker comprising a virtual voice assistant configured to adaptively generate conversational content, the smart speaker comprises:

a processor; and a memory communicatively coupled to the processor, wherein the memory stores processor-executable instructions which, when executed by the processor, cause the processor to:

receive a voice input from a first user via a voice interface, wherein the voice input comprises a query and a wake word associated with the electronic device;

transmit a request for accessing the adaptive conversational content generation service hosted on the cloud server in response to the query;

receive data associated with the first user from a plurality of at least one sources and providing the data to the cloud server, wherein the data is provided by an input user, wherein the input user is a living person associated with the first user, which may include the first user themselves;

create a personalized profile associated with the first user based on the received data;

generate conversational content in real-time to enable interaction between at least one query users and the virtual voice assistant accessing a trained conversation simulator based on the personalized profile associated with the first user, wherein the trained conversation simulator utilizes the adaptive conversational content generation service hosted on the cloud server;

provide the conversational content to the at least one query users during an interaction with the virtual voice assistant, wherein during the interaction, the at least one query users provides at least one input queries, and the trained conversation simulator generates the conversational content in real-time in response to the at least one input queries provided by the at least one query users;

anticipate at least one future interests and preferences of the at least one query users based on historical data and contextual cues using a predictive neural network model, wherein the predictive neural network model is configured for proactive conversation generation that aligns with the at least one query users evolving needs, wherein the predictive neural network model is configured to identify patterns and trends indicative of interests and preferences of the at least one query users over time, wherein the predictive neural network model comprises one of recurrent neural network, long short-term memory, gated recurrent unit and a convolutional neural network; and proactively generate conversational content aligned with the at least one future interests and preferences of the at least one query users, thereby adapting to the at least one query user's evolving needs;

dynamically adapt the conversational content based on real-time feedback from the at least one query users and at least one interaction patterns within the interaction, wherein the dynamically adapted conversational content is personalized by the virtual voice assistant and provides an engaging interaction experience; and provide the dynamically adapted conversational content to the at least one query users during the interaction via the virtual voice assistant.

* * * * *